(12) United States Patent
Nishiura et al.

(10) Patent No.: US 8,554,527 B2
(45) Date of Patent: Oct. 8, 2013

(54) PARTICLE SIMULATOR AND METHOD OF SIMULATING PARTICLES

(75) Inventors: Daisuke Nishiura, Yokosuka (JP); Hide Sakaguchi, Yokosuka (JP)

(73) Assignee: Japan Agency for Marine-Earth Science and Technology, Yokosuka-shi, Kanagawa (JP)

( * ) Notice: Subject to any disclaimer, the term of this patent is extended or adjusted under 35 U.S.C. 154(b) by 276 days.

(21) Appl. No.: 13/082,688

(22) Filed: Apr. 8, 2011

(65) Prior Publication Data

US 2012/0259602 A1    Oct. 11, 2012

(51) Int. Cl.
G06G 7/48    (2006.01)
(52) U.S. Cl.
USPC .............................................................. 703/7
(58) Field of Classification Search
USPC .............................................................. 703/7
See application file for complete search history.

(56) References Cited

FOREIGN PATENT DOCUMENTS

| JP | 2007-286514 | 11/2007 |
|----|-------------|---------|
| JP | 2009-69930  | 4/2009  |

OTHER PUBLICATIONS

Asmar et al.: Validation tests on a distinct element model of vibrating cohesive particle systems; Computers and Chemical Engineering 26 (2002) 785-802.*
Iwai et al.: Fast Particle Pair Detection Algorithms for Particle Simulations; Int. J. Mod. Physics C, vol. 10, No. 5 (1999) 823-837 © World Scientific Publishing Company.*
Tijskens et al.: Discrete element modeling for process simulation in agriculture; Journal of Sound and Vibration 266 (2003) 493-514.*
Zhao: Three-Dimensional Discrete Element Simulation for Granular Materials; PhD Thesis; Graduate College of the University of Illinois at Urbana-Champaign, 2006; pp. 1-137.*
D. Nishiura, et al., "Parallel-vector algorithms for particle simulations on shared-memory multiprocessors," Journal of Computational Physics, London, GB, vol. 230, No. 5, ISSN: 0021-9991, Mar. 1, 2011, pp. 1923-1938, XP027601172.
Hide Sakaguchi and Daisuke Nishiura, "Development of Hyper Intelligent Discrete Element Method (HiDEM) and its application for science and industry", JAMSTEC-R IFREE Special Issue, Nov. 2009, Jul. 31, 2009, p. 201-p. 209, with partial English Translation, (12 pages total).

* cited by examiner

*Primary Examiner* — Hugh Jones
(74) *Attorney, Agent, or Firm* — Drinker Biddle & Reath LLP

(57) ABSTRACT

The memory size used in DEM calculation of particle having a particle diameter distribution is suppressed.
A particle simulator includes a particle-information retaining unit 11 holding particle information including position and velocity information of a particle group, a particle-number changing unit 14 assigning particle numbers specifying particles in an order in accordance with the positions of the particles to the particle, a contact-candidate-list preparing unit 16 selecting particle pairs of a target particle and another particle that may be in contact with the target particle, a contact determining unit 18 calculating contact forces generated between particles in the particle pairs on the basis of particle information and storing the contact forces in the contact-force tables, a contact-force calculating unit 19 extracting contact forces of particles having a diameter greater than particles from contact-force tables using a contact-force reference table 54, extracting contact forces of particles having a diameter smaller than the particles by specifying the storage positions in the contact-force tables using integrated-contact-candidate numbers s_jgi[i], and calculating the sum of the contact forces, and a particle-information updating unit 20 updating the particle information on the basis of the contact forces of the particle.

5 Claims, 12 Drawing Sheets

PRIOR ART

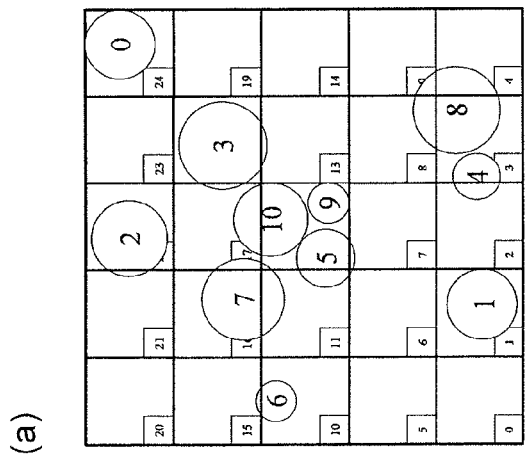
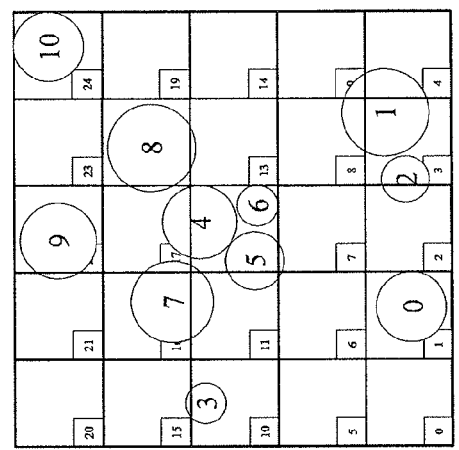
Fig.5

PARTICLE SIMULATOR AND METHOD OF SIMULATING PARTICLES

BACKGROUND OF THE INVENTION

1. Field of the Invention

The present invention relates to a particle simulator and a method of simulating particles.

2. Related Background Art

A discrete element method (DEM), which has originated through research in civil engineering, has been applied in particle technology. Today, the method is in great demand as a numerical analysis method used to solve an extremely wide variety of problems associated with not only particles but also continuous subjects that cannot be readily treated. Many other methods of numerically tracking discrete particle motion, such as molecular dynamics (MD), lattice gas automation (LGA), and smoothed particle hydrodynamics, have also been developed, in addition to the DEM. The DEM has a wide range of application compared to the other numerical particle analysis methods because the calculation of determining interparticle forces in consideration of geometric information of the particles, such as the size and shape of the particles, and solving Newton's motion equation can be performed at high speed. Size and shape can be considered in methods, such as a discontinuous deformation analysis (DDA), other than the DEM. Unfortunately, such a method exhibits high initial calculation load, and thus, it is not practical to process a large number of particles.

Commonly known granules and powders (which are hereinafter collectively referred to as "particles") that can actually be seen, such as sand and flour, usually includes particles of various different sizes unless special processing, such as particle-size adjustment through mesh control, is carried out (this state is referred to as a state having a "particle diameter distribution"). Such a particle diameter distribution greatly influences the homogeneity of the particle and mechanical properties, such as deformation and flow. In industries that process particles, the particle-diameter separation efficiency, the heterogeneity and mixing efficiency of particle layers due to particle size segregation, and control of transportation and filling is always problematic. Therefore, to process particles, it is critical to accurately understand how the effect of a particle diameter distribution on the overall behavior of a particle group.

Since the DEM is a method that can consider the particle size, as described above, it is understandable to use the DEM to determine the micromechanics of particles based on a particle diameter distribution. However, a decrease in the particle diameter to 1/n causes a decrease in the volume of the particle to $(1/n)^3$. This indicates, $n^3$ particles with reduced volume are required to fill the volume of the original particle (precisely, the number of reduced-volume particles required is less than $n^3$ because there will be gaps between the particles, but the order of the number is the same). Therefore, a wide particle diameter distribution cannot be processed due to restrictions on the amount of computer memory and calculation time. For example, natural soil contains particles varying in size by approximately five digits, e.g., from gravels having a diameter of several centimeters to natural clay having a diameter of several microns. Under an assumption that particles of each different size group occupy the same volume, if only one particle having a maximum diameter is included, the total number of particles will be on the order of $(10^5)^3$.

In the case where a particle diameter distribution is processed using the DEM, a disadvantage is imbalance of the number of contact points due to the difference in particle diameter, in addition to the problem on the number of particles. For example, if the particle diameter ratio of the maximum particle to the minimum particle is r:1, the number of minimum particle covering the surface of a maximum particle is $4(r+1)^2/1^2$, whereas the number of maximum particles filling the surface covering the surface of a minimum particle is $4(r+1)^2/r^2$. In other words, the maximum imbalance of the number of contact points is on the order of $r^2:1$. The imbalance in the number of contact points lead to an imbalance in the number of calculation processes performed to determine the contact forces of the particles and the amount of calculation required to determine the sum of the contact forces. Specifically, if the particle diameters are not uniform and the particle diameter ratio increases in the DEM, the number of particles increases simply due to geometric features on the diameter, and causes an imbalance in the number of contact points. As a result, the calculation load considerably increases. In addition, if a particle diameter distribution exists in the actual program for the DEM, processing of refined search of contact candidates of which the contact is to be determined and storing contact-candidate pairs causes a significantly high calculation load compared with a uniform particle size.

In response to such problems concerning a particle diameter distribution, several methods of DEM programing for increasing processing speed associated with extracting and storing contact-candidate pairs have been proposed (for example, Japanese Unexamined Patent Application Publication No. 2007-286514 (Patent Literature 1)).

Today, high speed numerical simulation using GPUs, which have a high cost performance rate compared with CPUs, is actively used. In response to this, instead of vector processing using expensive super computers, the use of high-speed algorithms for GPUs, which are inexpensive but capable of super parallel computing equivalent to vector operation, have been promoted for particle system simulation (for example, Japanese Unexamined Patent Application Publication No. 2009-69930 (Patent Literature 2)).

SUMMARY OF THE INVENTION

The conventional high-speed DEM according to Patent Literature 1 involves storing particles in cells and then optimizing the cell size and cell search range and is not particularly aimed for a substantial increase in processing speed by parallelization and vectorization. Specifically, if the process of storing particles into cells by looping the particle numbers is performed through single-instruction multiple-data (SIMD) parallel processing, competitive writing occurs in the memory when two or more particles are stored in the same cell, which is an extremely inconvenient situation. Such a problem of competitive writing in the memory also occurs in particles having a uniform diameter if a plurality of particles is included a single cell. However, if there is a particle diameter distribution, a distribution of the particles contained in a single cell is wide in itself, causing an even greater problem in increasing the processing speed by parallelization and vectorization.

The detection of contact-candidate particle pairs using a GPU high-speed algorithm according to Patent Literature 2 is performed by employing a method of searching cells after storing particles therein in the same manner as the CPU-based program. However, since competitive writing in the memory also occurs with the GPU when a plurality of particles is stored in the same cell, several solutions are provided to prevent such a problem. One solution is a method of repeating several times the storage of particle and confirmation. Another method use an exclusion function (Atomic function) included in the compiler. To prevent competitive writing in the memory during a routine for calculating the interparticle contact forces, the same calculation of calculating the contact forces between particles i and j is performed twice for both the particles i and the particles j.

However, as described above, if there is a particle diameter distribution, the number of particles stored in a cell is likely to vary greatly in different cells, and the number of contact particles of a large particle is significantly larger than that of a small particle. Therefore, the load balance tends to be disturbed. For example, in the case where GPU calculation is performed for a two-component-system particle group using a three-dimensional DEM employing these methods, it is reported that the particle diameter ratio of the two components is set to 1:4, and the calculation time is extended by three times compared with a single component system The DEM simulation of particles considering a particle diameter distribution leads to a drastic increase in the number of neighboring particles of which contact-candidate forces are to be considered. Accordingly, there is a problem of increasing a required volume of memory to perform DEM calculation.

Unlike in CPU calculation, the memory cannot be increased by hardware in GPU calculation. Accordingly, processing can only be performed using a limited volume of memory in a graphic card. The shortage in GPU memory may be supported by the CPU memory through transfer communication. However, this is not recommended since the transfer speed between the GPU memory and the CPU memory is extremely low, and the high calculation efficiency of the GPU is not fully used. Since the memory size for an existing GPU used in DEM calculation is 4 GB at a maximum, the problem concerning the memory size used prevents the use of GPU in particle simulation. This problem exists not only in GPUs but also in hardware (for example, a vector processor) (hereinafter referred to as "shared-memory parallel computer") that performs shared-memory SIMD parallel processing similar to that performed by a GPU.

The present invention has been conceived to solve the problem described above and provides a particle simulator and a method of simulating particles that are capable of reducing the amount of memory during DEM calculation of particle having a particle diameter distribution by a shared-memory parallel computer.

To solve the problem described above, a particle simulator according to the present invention simulating the behavior of particles in a particle group having a diameter distribution in a work area through calculation of positions and velocities of the particles based on values of contact forces generated between the particles and other particles in the particle group, the particle simulator comprising: input means for inputting particle information including position information and velocity information of the particles; particle-information storing means for storing the particle information; assigning means for assigning specific information items to the particles to identify the particles in an order in accordance with the position information; contact-candidate selecting means for selecting target particles from particle group in the ascending order of the specific information items and selecting non-target particles paired with the target particles as contact-candidate pairs, the non-target particles presumably being in contact with the target particles and having a diameter smaller than the diameter of the target particles; contact-force calculating means for calculating the values of contact forces generated between the two particles in the contact-candidate pairs selected by the contact-candidate selecting means based on the position information and the velocity information of the paired particles and storing information items of the calculated values of contact forces in an order corresponding to the order of the contact-candidate pairs in contact-force tables; contact-force-reference-table preparing means for preparing contact-force-reference tables including reference information used to refer to the contact-force tables to retrieve the values of contact forces generated between the particles and neighboring particles neighboring the particles and having a diameter greater than the diameter of the particles; integral-contact-candidate-number calculating means for calculating integral contact-candidate numbers being integral values of contact-candidate numbers indicating the numbers of neighboring particles neighboring the particles having a diameter smaller than the diameter of the particles; contact-force-sum computing means for extracting the values of contact forces generated between the particles and other particles having a diameter greater than the diameter of the particles by using the reference information in the contact-force-reference tables, extracting the values of contact forces generated between the particles and other particles having a diameter smaller than the diameter of the particles by specifying the storage positions of the values of contact forces in the contact-force tables using the integral contact-candidate numbers, and computing the sum of contact forces for each particles using the extracted values of contact force; calculating means for calculating new position information and velocity information of the particles based on the values of contact forces of the particles calculated by the contact-force-sum computing means; and particle-information updating means for updating the particle information stored in the particle-information storing means using the new position information and velocity information calculated by the calculating means.

Similarly, to solve the problem described above, a method of simulating particles in a particle simulator of the invention simulating the behavior of particles in a particle group having a diameter distribution in a work area by calculating the positions and velocities of the particles based on values of contact forces generated between the particles and other particles in the particle group, the method comprising, the steps of inputting particle information including position information and velocity information of the particles and storing the particle information in particle-information storing means; assigning specific information items to the particles to identify the particles in an order in accordance with the position information; selecting target particles from particle group in the ascending order of the specific information items and selecting non-target particles paired with the target particles as contact-candidate pairs, the non-target particles presumably being in contact with the target particles and having a diameter smaller than the diameter of the target particles; calculating the values of contact forces generated between the two particles in the contact-candidate pairs selected in the selecting step based on the position information and the velocity information of the paired particles and storing information items of the calculated values of contact forces in an order corresponding to the order of the contact-candidate pairs in contact-force tables; preparing contact-force-reference tables including reference information used to refer to the contact-force tables to, retrieve the values of contact forces generated between the particles and neighboring particles neighboring the particles and having a diameter greater than the diameter of the particles; calculating integral contact-candidate numbers being integral values of contact-candidate numbers indicating the numbers of neighboring particles neighboring the particles having a diameter smaller than the diameter of the particles; extracting the values of contact forces generated between the particles and other particles having a diameter greater than the diameter of the particles by using the reference information in the contact-force-reference tables, extracting the values of contact forces generated between the particles and other particles having a diameter smaller than the diameter of the particles by specifying the storage positions of the values of contact forces in the contact-force tables using the integral contact-candidate numbers, and computing the sum of contact forces for each particles using the extracted values of contact force; calculating new position information and velocity information of the particles based on the values of contact forces of the particles calculated in the extracting step; and updating the particle information stored in the particle-information storing means using the new position information and velocity information calculated by the calculating step.

According to such a particle simulator and a method of simulating particles, for a particle neighboring a particle and having a diameter smaller than that of the particle among all particles in the work area, only the integral contact-candidate numbers, which represent the numbers of particles, is stored, and the contact forces are extracted by specifying the storage positions of the contact-force tables using the integral contact-candidate numbers. In this way, the contact-force reference tables do not have to contain information associated with particles having a diameter smaller than that of particles among particles neighboring the particles, and merely information of particles having a diameter greater than that of the particles needs to be stored. During simulation on a particle group having a particle diameter distribution, if particles having a diameter smaller than that of the particle are considered, the number of particles that may simultaneously contact the particle will increases. Thus, a large memory area must be provided in advance for the contact-force reference table. In contrast, the configuration according to the present invention requires consideration of only the contact between the particle and particles having a diameter greater than that of the particle. Thus, the number of particles for which contact determination need to be performed is decreased, and the memory region required for preparing the contact-force reference tables can be decreased. As a result, the memory size used can be reduced. Such a reduction in the memory size used enables particle simulation using a shared-memory parallel computer, such as a GPU.

In the particle simulator, it is desirable that the work area be segmented into a plurality of cells, each cell having a cell number, the particle information include the cell numbers of the cells specified by the position information and containing the particles, and the assigning means identifies the particles in an order corresponding to the cell numbers and assigns specific information items specified in accordance with the order corresponding to the particle diameter to particles in the same cell.

Similarly, in the method of simulating particles it is desirable that the work area be segmented into a plurality of cells, each cell having a cell number; the particle information includes the cell numbers of the cells specified by the position information and containing the particles; and in the assigning step, the particles in an order corresponding to the cell numbers are identified and assigns specific information items in accordance with the order corresponding to the particle diameter to particles in the same cell.

According to this configuration, since specific information is assigned by identifying the particles in the order of the cell number, and identifying the particles in the same cell in an order in accordance with the particle diameter, the particles are sorted by cell number, and particles in the same cell are sorted by particle diameter. Upon preparation of the contact-force reference tables, particles having a small diameter can be easily recognized on the basis of the specific information and do not have to be selected for entry to the contact-force reference tables. As a result, the calculation efficiency can be improved during preparation of the contact-force reference table.

In the particle simulator, it is desirable that the contact-candidate selecting means selects the target particles from the particle group in the ascending order of the specific information items and prepares contact-candidate lists of the target particles including, for all of the particles in the work area, contact-candidate-pair information including pairs of the target particles and the non-target particles presumably being in contact with the target particles and having a diameter smaller than the diameter of the target particles and contact-candidate numbers assigned to the pairs in the ascending order; the contact-force calculating means calculates the values of contact forces generated between the paired particles corresponding to the contact-candidate-pair information included in the contact-candidate lists are calculated based on the position information and the velocity information of the paired particles and store contact-force information linking the calculated values of contact forces and the contact-candidate number in contact-force tables; the contact-force-reference-table preparing means prepares the contact-force-reference tables linking the contact-candidate numbers associated with the particles and other particles with the particles and the other particles as reference information used to refer to the contact-force tables to retrieve the values of contact forces generated between the particles and the other particles presumably being in contact with the particles and having a diameter greater than the diameter of the particles; the integral-contact-candidate-number calculating means calculates integral contact-candidate numbers s_jgi[i] (where i represents specific information items of the particles) being integral values integrating, in the order of the specific information items, contact-candidate numbers indicating the number of other particles presumably being in contact with the particles and having a diameter smaller than the diameter of the particles; and the contact-force-sum computing means extracts the values of contact forces of the particles from the contact-force tables using the reference information of the contact-force-reference tables, extract the values of contact forces corresponding to the contact-candidate numbers s_jgi[i−1] to s_jgi[i]−1 from the contact-force tables using the integral contact-candidate numbers s_jgi[i], and calculate the sum of the contact forces of the particles using the extracted information of the contact forces.

The particle simulator and the method of simulating particles according to the present invention, can reduces the memory size used during DEM calculation of particles having a particle diameter distribution by a shared-memory parallel computer.

BRIEF DESCRIPTION OF THE DRAWINGS

FIG. 5 illustrates the process of changing particle numbers and storing the maximum value and minimum value of the particle number in each cell.

DESCRIPTION OF THE PREFERRED EMBODIMENTS

Figure 1:
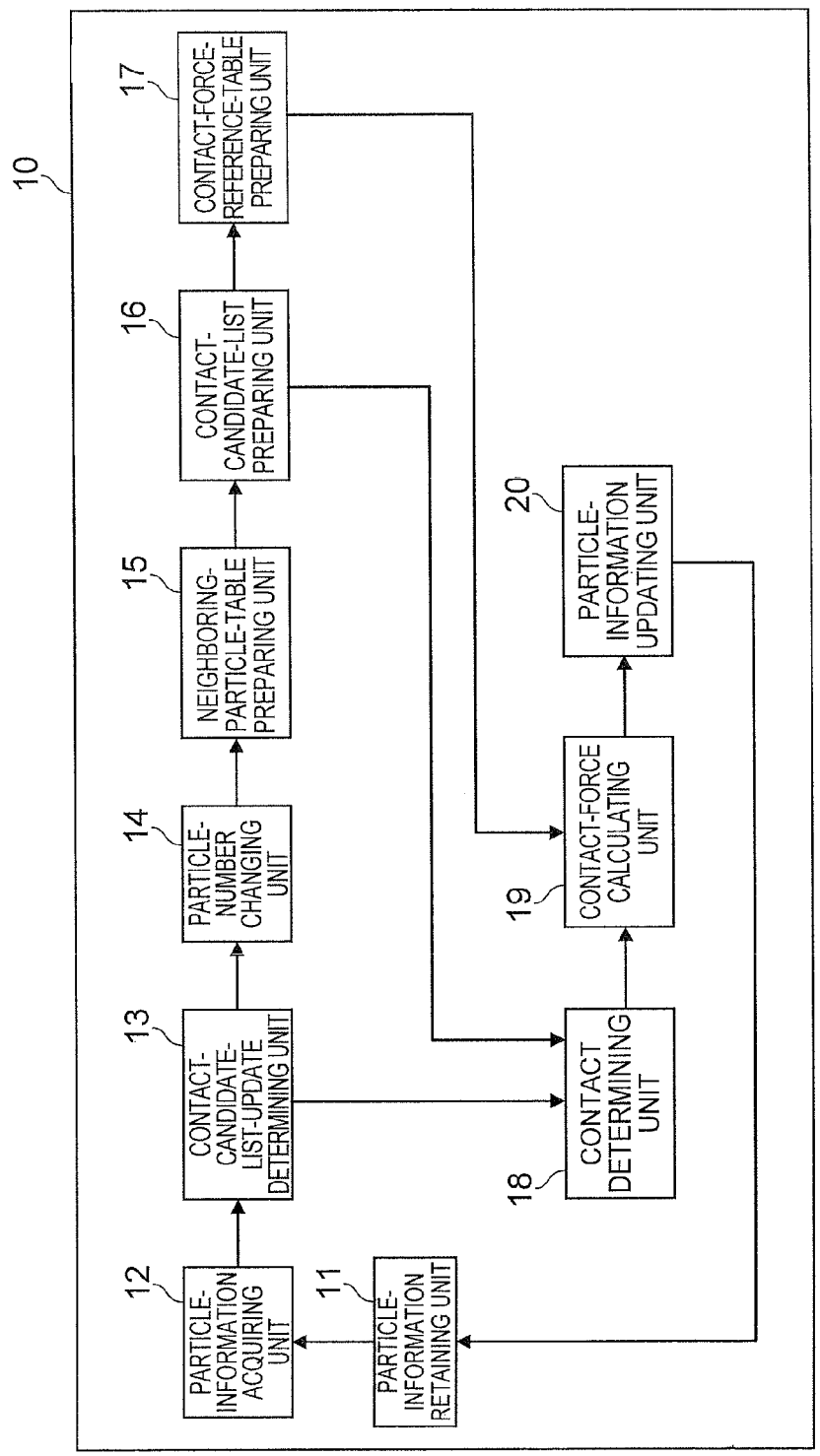
FIG. 1 is a functional block diagram of a particle simulator according to an embodiment of the present invention.

Embodiments of the present invention will be described below with reference to the accompanying drawings. The same components are represented by the same reference numerals without repeated description.

FIG. 1 is a functional block diagram of a particle simulator 10 according to an embodiment of the present invention. As illustrated in FIG. 1, the particle simulator 10 includes a particle-information retaining unit (input means and particle-information storing means) 11, a particle-information acquiring unit 12, a contact-candidate-list-update determining unit 13, a particle-number changing unit (assigning means) 14, a neighboring-particle-table preparing unit 15, a contact-candidate-list preparing unit (contact-candidate-particle selecting means and integrated-contact-candidate-number calculating means) 16, a contact-force-reference-table preparing unit (contact-force-reference-table preparing means) 17, a contact determining unit (contact-force calculating means) 18, a contact-force calculating unit (contact-force-sum computing means) 19, and a particle-information updating unit (calculating means and particle-information updating means) 20

The particle simulator 10 is a computer including hardware such as a graphics processing unit (GPU), a random access memory (RAM) and a read only memory (ROM), which are main storage devices, an auxiliary storage device, such as a hard disk drive, an input device, such as an input keyboard, an output device, such as a display, and a communication module, which is a data transmission/reception device, such as a network card. The functions of the particle simulator 10 described below with reference to FIG. 1 are achieved by predetermined computer software loaded into the hardware, such as the GPU and the RAM to operate the input device, the output device, and the communication module under the control of the GPU and to read/write data from/to the RAM and the auxiliary storage device.

A particle model used in this embodiment will be described below. The particle simulator 10 according to this embodiment performs a DEM simulation of a particle group having a certain particle-diameter distribution. More specifically, a particle model including particles having various diameters is used.

Figure 2:
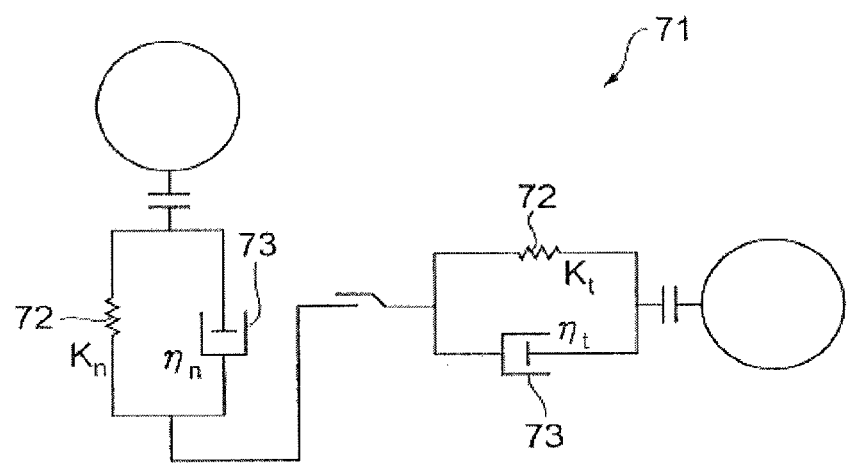
FIG. 2 is a schematic view of a Voigt model applied to a particle model according to this embodiment.

In such a particle model, the normal component $F_n$ and tangential component $F_t$ of an interparticle contact force generated between individual particles are represented by the following expressions by using a Voigt model 71, which is illustrated in FIG. 2.

$$F_n = \eta_n v_n + K_n x_n \quad (1)$$

$$F_t = \min[\eta_t v_t + K_t x_t, \mu_r |F_n| n_t] \quad (2)$$

where x represents a relative displacement vector, v represents a relative velocity vector, K represents the elastic modulus of a linear spring 72, and η represents the viscous damping coefficient of a dashpot 73. The subscripts n and t represent a normal component and a tangential component, respectively. $\mu_r$ represents the coefficient of sliding friction, and min represents a function representing the value of the smaller of input values. The relationship between the viscous damping coefficient η and a coefficient of restitution e is represented by the following expression.

$$\eta_q = -\frac{2\ln e}{\sqrt{\pi^2 + \ln^2 e}} \sqrt{\frac{2 m_i m_j}{m_i + m_j} K_q} \quad (3)$$

where $m_i$ and $m_j$ represent the masses of particles i and j, respectively. The subscript q is equals to n for a normal component and t for a tangential component.

Accordingly, equations of motion of translation and rotation around the center of gravity, which are processed in the DEM, are represented below by Expressions 4 and 5.

$$m_p \frac{\partial u_p}{\partial t} = F_n + F_t - m_p g \quad (4)$$

$$I_p \frac{\partial \omega_p}{\partial t} = R \times F_t - \mu_r b |F_n| n_r \quad (5)$$

where $u_p$ represents the velocity of a particle, $\omega_p$ represents the angular velocity of the particle, $m_p$ represents the mass of the particle, $I_p$ represents the moment of inertia of the particle, and R represents a position vector from the center of the particle to a contact point. The subscript p is equals to i for a particle i and j for a particle j. The second term on the right side indicates the rolling friction, where $\mu_r$ represents the coefficient of rolling friction and b represents the width of the contact surface. Expressions 1 and 2 of the Voigt model 71 are used by the contact determining unit 18 to calculate the interparticle contact force, whereas the equations of motion, i.e., Expressions 4 and 5, are used by the particle-information updating unit 20 to calculate the coordinates of a particle.

Figure 3:
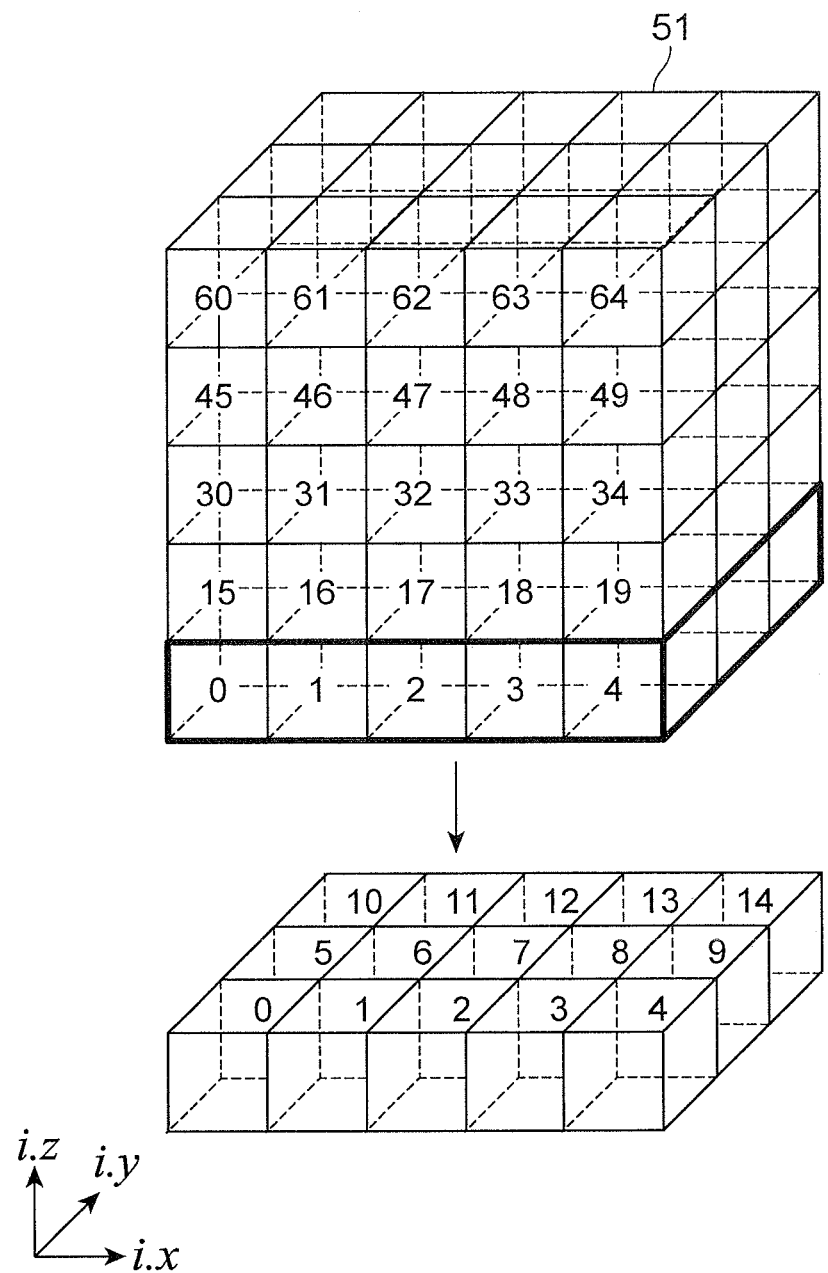
FIG. 3 illustrates a work area according to this embodiment.

In this embodiment, a work area 51, which is the area in which the particles move, is divided into cubic cells having sides, each having a length of csize, as illustrated in FIG. 3. The cell size csize is determined by the following expression using a parameter $\phi$ ($0 \leq \phi \leq 1$).

$$c\text{size} = 2.0\{(1.0-\phi)r_{max} + \phi r_{min}\}(1.0+\alpha) \quad (6)$$

where $r_{max}$ represents the maximum particle diameter in the particle model arranged in the work area, $r_{min}$ represents the minimum particle diameter, and α represents a parameter for adjusting the updating frequency, which is set to, for example, 0.2. Each cell in the work area 51 is assigned a cell number cell_id. The cell number is one-dimensional, as illustrated in FIG. 3, and is represented by, for example, the fowling expressions.

$$cell\_id = i.x + id.x \times i.y + id.x \times id.y \times i.z$$

$$i.m = \{0,1,2,\ldots, id.m-1\} (m=x,y,z) \quad (7)$$

where cell_id represents a cell number, i.m represents the cell position in the m direction, id.m represents the number of cells in the m direction. After simulation conditions, i.e., the maximum particle diameter $r_{max}$, the minimum particle diameter $r_{min}$, and the parameters $\phi$ and $\alpha$, are set, the particle simulator 10 automatically calculates and sets the cell size csize of the work area 51 and assigns cell numbers to the defined cells.

The particle-information retaining unit 11 holds particle information of each particle in the work area 51. The particle information includes coordinates (position information), translation velocity (velocity information), rotational velocity (velocity information), particle radius, mass, particle number, and cell number. The coordinates are three-dimensional coordinates (pos.x, pos.y, pos.z) in the three-dimensional work area 51, which is illustrated in FIG. 3. The particle number is the number for identifying a particle. The cell number is the cell number assigned to the cell containing the particle. To begin simulation, the particle-information retaining unit 11 sets the particle radii and masses of particles in accordance with the particle-diameter distribution used in the simulation and randomly assigns the coordinates, velocities, particle numbers to these particles. Each cell number corresponding to each particle is assigned the cell number of the cell contain the particle that is identified on the basis of the coordinates randomly assigned to the particle. Each information item generated in this way is input and stored in the particle-information retaining unit 11. When the particle information items are updated by the particle-information updating unit 20, which is described below, during the particle simulation, the particle-information retaining unit 11 replaces the stored particle information items with the particle information items updated by the particle-information updating unit 20.

The particle-information acquiring unit 12 acquires particle information from the particle-information retaining unit 11. The particle-information acquiring unit 12 acquires initial particle information set in advance from the particle-information retaining unit 11 at the beginning of the particle simulation. Every time the particle-information retaining unit 11 updates the particle information during the particle simulation, the particle-information acquiring unit 12 acquires the updated particle information from the particle-information retaining unit 11. The particle-information acquiring unit 12 sends the acquired particle information to the contact-candidate-list-update determining unit 13.

The contact-candidate-list-update determining unit 13 determines whether or not to update a contact-candidate list 53, which is described below. The contact-candidate list 53 is updated, for example, if a particle of which the integrated traveling distance is greater than $r\alpha$ is present, where r represents the particle radius and $\alpha$ represents a parameter for adjusting the updating frequency, which is set to, for example, 0.2. The integrated traveling distance is determined for each particle, for example, every time the particle-information acquiring unit 12 acquires updated particle information from the particle-information retaining unit 11. The integrated traveling distance of a particle is determined by integrating the latest travelling distance of the particle, which is calculated from the difference between coordinate data in the particle information acquired in the current step and the coordinate data in the particle information acquired in the last step. The contact-candidate-list-update determining unit 13 holds the particle information acquired in the last step, the parameter $\alpha$, and the integrated traveling distance of particles. Upon reception of updated particle information from the particle-information acquiring unit 12, the contact-candidate-list-update determining unit 13 updates the integrated traveling distance and determines the existence of a particle of which the updated integrated traveling distance is greater than $r\alpha$. If a particle of which the integrated traveling distance is greater than a predetermined value is present, the contact-candidate-list-update determining unit 13 determines that the contact-candidate list should be updated and transmits the updated particle information to the particle-number changing unit 14. The integral value of the particle traveling distances is initialized every time the contact-candidate list 53 is updated. If the contact-candidate-list-update determining unit 13 determines that the contact-candidate list does not have to be updated because there are no particles of which the integrated traveling distance is greater than $r\alpha$, the contact-candidate-list-update determining unit 13 does not send particle information to the particle-number changing unit 14 and sends the updated particle information to the contact determining unit 18.

The particle-number changing unit 14 identifies the particles in the order of the cell numbers (i.e., in the order corresponding to the position information) and assigns particle information (specifying information) to particles contained in the same cell in order of the particle diameter for each of the particles in the work area 51. In other words, the particle-number changing unit 14 renumbers the particles on the basis of the cells containing the particles in the work area 51 and the particle diameter and sorts out the particles by the new particle numbers.

Figure 4:
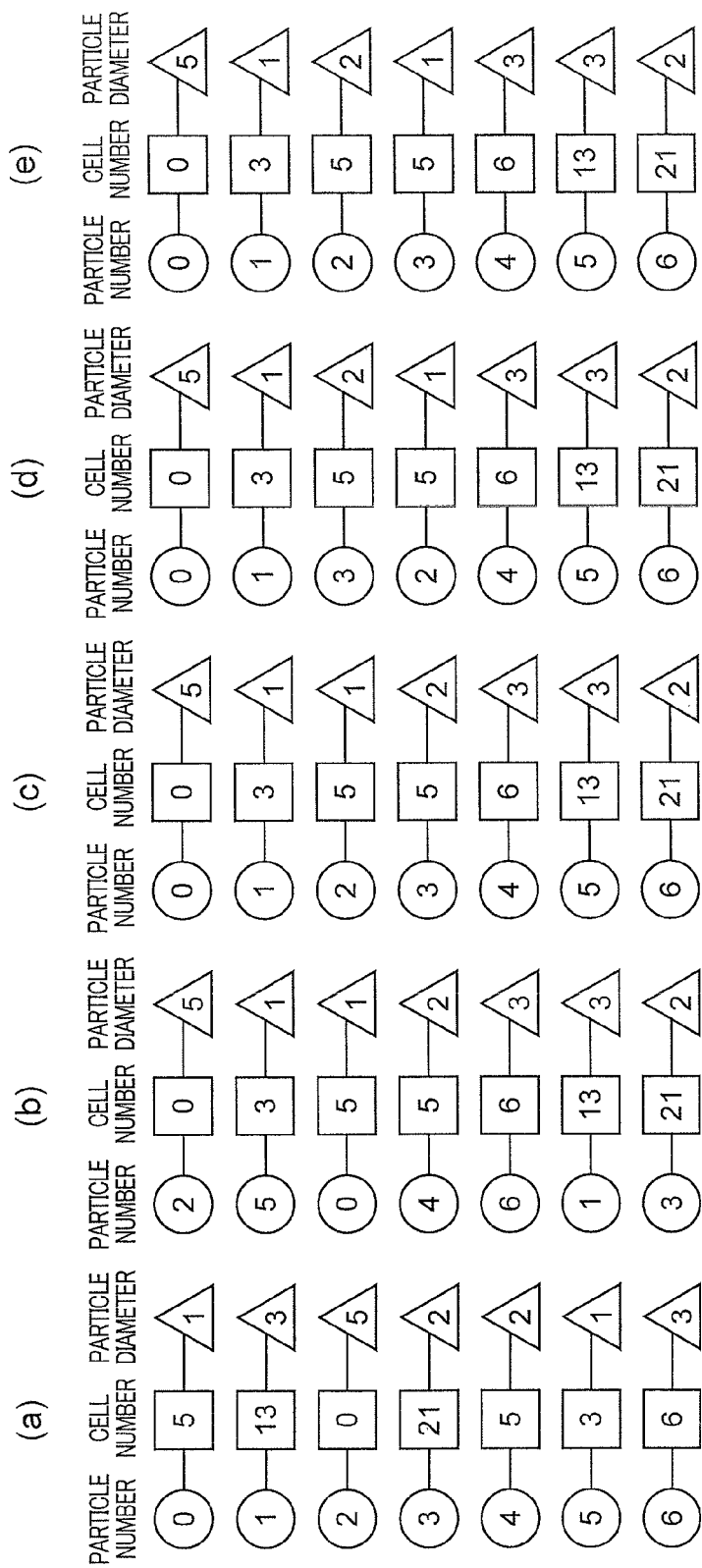
FIG. 4 illustrates a flow of changing particle numbers.

Upon receiving the particle information from the contact-candidate-list-update determining unit 13, the particle-number changing unit 14 creates information sets, each linking the particle number of individual particles with the diameter of the particle and the cell number of the cell containing the particle, as illustrated in FIG. 4, and stores these information sets in the order of the particle numbers (FIG. 4(a)). The information sets are rearranged in the ascending order of cell numbers (4(b)), and then the particle numbers are reassigned in the order of cell numbers (FIG. 4(c)). The particle diameters of particles having the same cell number are compared to rearrange these particles in the descending order of the particle diameter (FIG. 4(d)). Then, the particle numbers are reassigned on the basis of particle diameter (FIG. 4(e)).

Through this rearrangement process of the particle numbers, for example, the particle numbers of particles disposed in the work area 51, as illustrated in FIG. 5(a), are renumbered according to the cell numbers and particle diameters, as illustrated in FIG. 5(b). The particle-number changing unit 14 transmits the particle information containing the change in particle numbers to the neighboring-particle-table preparing unit 15.

The neighboring-particle-table preparing unit 15 prepares neighboring-particle tables 52 containing information about particles neighboring individual particles in the work area 51. In the neighboring-particle-table preparing unit 15, "neighboring particles" are defined as particles in adjoining cells that adjoin a target cell, which contains a target particle, and in neighboring cells, which outwardly adjoin the adjoining cells, having a particle diameter greater than that of the target particle or having a particle number, which is assigned in the initial position, greater than that of the target particle in the case where the particle diameters are the same. The assignment of neighboring particles will be described in detail below.

Memory regions are reserved in advance in the neighboring-particle-table preparing unit 15 for preparing the neighboring-particle tables 52. The memory regions for neighboring-particle tables are set to the same size in consideration of the number of neighboring particles that may come into contact with each particle.

Upon receiving the particle information from the particle-number changing unit 14, the neighboring-particle-table preparing unit 15 stores the minimum particle number Pnum_in_cellmin and the maximum particle number Pnum_in_cellmax selected among particles having the same cell number (FIG. 5(c)). In FIG. 5(c), the maximum particle number is stored in the upper left region and the minimum particle number is stored in the lower right region in a cell. More specifically, each cell cell_id is provided with a sequence in which information about the minimum particle number Pnum_in_cellmin[cell_id] and the maximum particle number Pnum_in_cellmax[cell_id] of particles contained in the cell is stored. In this way, each cell of the cell number cell_id contains particles numbered from Pnum_in_cellmin[cell_id] to Pnum_in_cellmax[cell_id] in the descending order of particle diameter.

The cell number nei_cell_id of a cell adjoining the cell cell_id is represented by the following expression.

$$nei\_cell\_id[n]=cell\_id+con[n] \quad (8)$$

where con represents a constant determined by id.x and id.y. Since the particle numbers are sorted by the cell number, each neighboring cell contains particles continuously numbered from Pnum_in_cellmin[nei_cell_id] to Pnum_in_cellmax[nei_cell_id].

Figure 6:
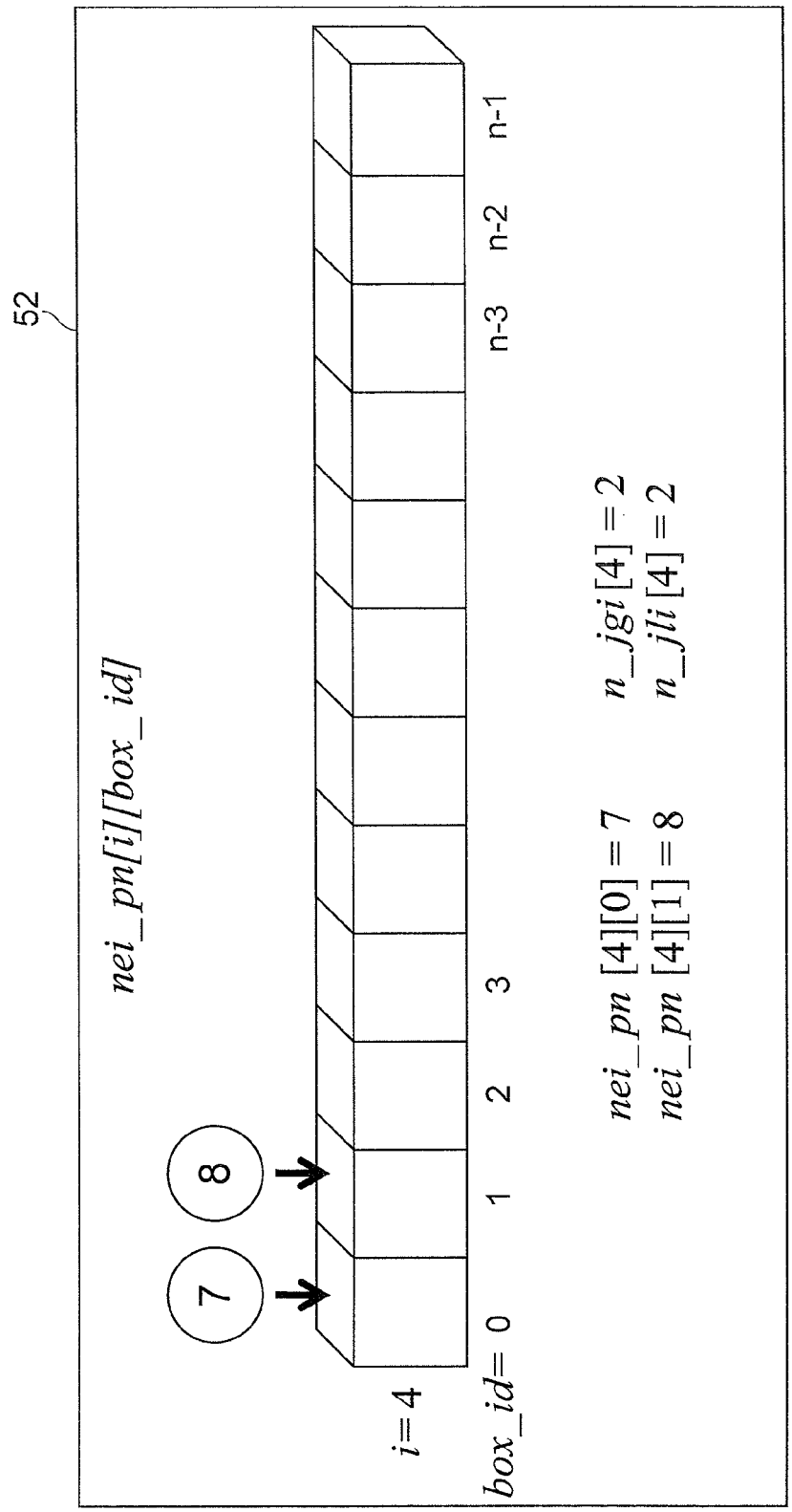
FIG. 6 illustrates an example configuration of a neighboring-particle table.

The neighboring-particle-table preparing unit 15 prepares storage boxes (sequence) nei_pn[i][box_id] for storing neighboring particles of each particle, such as that illustrated in FIG. 6. Among the particles in a search range (which is defined below) around a particle i, particles that satisfy the following Conditions a, b, and c are stored in the boxes in the ascending order of the box numbers (box_id): a) particles of which the interparticle distance to the particle i is smaller than dis_lim; b) particles having a diameter greater than the diameter of the particle i; and c) if particles have the same diameter as the diameter of the particle i, the particles having a particle number (i=p_id) assigned in the initial position greater than the particle number of the particle i, where $dis\_lim=(r_i+r_j)(1.0+\alpha)$, $r_i$ and $r_j$ represent the particle radii of paired neighboring particles i and j, respectively, and $\alpha$ represents a parameter for adjusting the updating frequency of contact candidates. For example, $\alpha$ is set to 0.2. The neighboring-particle-table preparing unit 15 calculates dis_lim using the particle radii $r_i$ and $r_j$, which are included in the particle information received from the particle-number changing unit 14, and the parameter $\alpha$ which is stored in advance in the neighboring-particle-table preparing unit 15.

A particle that satisfies Conditions (a), (b), and (c) is referred to as a "neighboring particle" of particle i. The collection of the series of boxes, which is illustrated in FIG. 6, provided for every particle i in the work area 51 is referred to as a "neighboring-particle table 52" in this embodiment. The neighboring-particle table 52 is a two-dimensional sequence nei_pn[i][box_id] associated with each particle i and the number (box_id) of neighboring particles of each particle i.

Through this procedure, for target particles i, only particles j having a particle diameter greater than that of the particle i are stored in the neighboring-particle table 52. Therefore, increasing the memory area required for the neighboring-particle table 52 is inhibited.

In order to determine the neighboring particles of the particle i, the neighboring-particle-table preparing unit 15 has to search for particles at a distance $(r_{max}+r_i)(1.0+\alpha)$ from particle i. In addition to the 26 cells adjoining the cell containing the particle i, the search range is expanded to outer cells in accordance with the radius $r_{max}$ of the largest particle in the particle model.

The range of neighboring cells searched by the neighboring-particle-table preparing unit 15 is determined using the following expression, where csize represents the cell size calculated by Expression 6, $r_{max}$ represents the maximum particle radius of the largest particle in the work area, and $r_i$ represents the radius of the target particle i.

$$nei\_cell=2\cdot ceil\{2.0(r_{max}+r_i)(1.0+\alpha)/csize\}-1 \quad (9)$$

where ceil represents a function for rounding up the fractional part and is stored in advance in the neighboring-particle-table preparing unit 15, and nei_cell represents the number of cells to be searched in the plus and minus directions of the x, y, and z directions from the cell containing the particle i.

Consequently, as the cell size is reduced, there is a worry that the number of cells to be searched increases exponentially, increasing the calculation load. Meanwhile, for the cells on the outer side of the adjoining 26 cells, the order of the particles sorted in accordance with particle diameter can be used to increase the efficiency of searching neighboring particles. Specifically, each cell contains particles from cell numbers Pnum_in_cellmin[cell_id] to Pnum_in_cellmax[cell_id] in the descending order of particle diameter, and determination of whether or not a particle is a neighboring particle is also performed on particles in the descending order of particle diameter. Since the diameter of particles that do not satisfy above-described Condition (a) is determined on the basis of the cell containing the particle i and the positional relationship between the particle i and the neighboring particles, the interparticle distance does not have to be checked in every cell up to Pnum_in_cellmax[cell_id], but the search can be terminated at a particle number corresponding to a particle having a diameter that does not satisfy Condition (a). A particle diameter $r_j$, which does not satisfy Condition (a) for the particle i, satisfies the following expression:

$$2ceil\{2.0(r_j+r_i)(1.0+\alpha)/csize\}-1<dis\ cell \quad (10)$$

where, dis cell represents the number of cells from the cell containing the particle i to the cell containing particle j in one of the x, y, and z directions having the least cell number.

The neighboring-particle-table preparing unit 15 stores neighboring particle numbers n_jli[i] of particles neighboring the particle i and particle numbers and n_jgi[i] of particles that satisfy Condition (a) but do not satisfy Conditions (b) and (c) in corresponding one-dimensional sequences.

In FIG. 6, search is performed for a particle numbered 4 (i=4). If the particles numbered 5, 6, 7, and 8 satisfy Condition (a) as the search result, if the particles numbered 7 and 8 are neighboring particles, and if the particles numbered 5 and 6 do not satisfy Conditions (b) and (c), the following equations hold:

$$nei\_pn[4][0]=7$$

$$nei\_pn[4][1]=8$$

$$n\_jgi[4]=2$$

$$n\_jli[4]=2$$

When the neighboring-particle-table preparing unit 15 receives particle information from the particle-number changing unit 14, cells in the search range nei_cell are defined for every target particle i, and the particle numbers of particles other than the particle i in the search range that satisfy Conditions (a), (b), and (c) are stored in the sequence nei_pn[i][box_id] of the neighboring-particle table 52. The number of neighboring particles is stored in sequence n_jli[i], whereas the number of particles that satisfy Condition (a) but do not satisfy Conditions (b) and (c), i.e., the number of particles in the search range and not being stored in the neighboring-particle table 52 because their diameters are smaller than the diameter of the target particle i is stored in sequence n_jgi[i]. The information of nei_pn[i][box_id], n_jli[i], and n_jgi[i] is sent together with particle information to the contact-candidate-list preparing unit 16.

In this embodiment, only information of particles that have a diameter greater than or equal to the diameter of the target particle is stored in the neighboring-particle table 52. In a multi-component system including particles having various different diameters, the number of small particles that are contact candidates for large particles may be enormous. That is, numerous numbers of the particles having a diameter smaller than that of the target particle can simultaneously contact the target particle. Therefore, if particle having a diameter smaller than that of the target particle are included in the neighboring particles, number of sequences for the neighboring-particle table 52 has to be increased in advance in consideration of a maximum. In such a case, an enormous amount of memory for the sequences in the neighboring-particle table 52 is required, and the global memory of the GPU may be exhausted. In this embodiment, since only particles that are larger than the target particle are stored in the neighboring-particle table 52, the amount of memory used for the sequences prepared in advance for the neighboring-particle table 52 is inhibited.

The contact-candidate-list preparing unit 16 sequentially selects target particles in the ascending order of the particle number (specific information) from among all particles in the work area 51 and selects contact candidate pairs of target particles and particles that may be in contact with the target particles and that have a diameter smaller than that of the target particles. Specifically, the contact-candidate-list preparing unit 16 prepares the contact-candidate list 53 containing information on particle pairs of particles that are selected from all particles in the work area 51 and may be in contact with each other. More specifically, the contact-candidate list 53 includes one-dimensional sequences list_i[Lnum] and list_j[Lnum] in which the particle numbers of particles i and j, which may be in contact with each other, are respectively stored, where Lnum represents a contact-candidate number given to each pair of particles in contact with each other.

Figure 7:
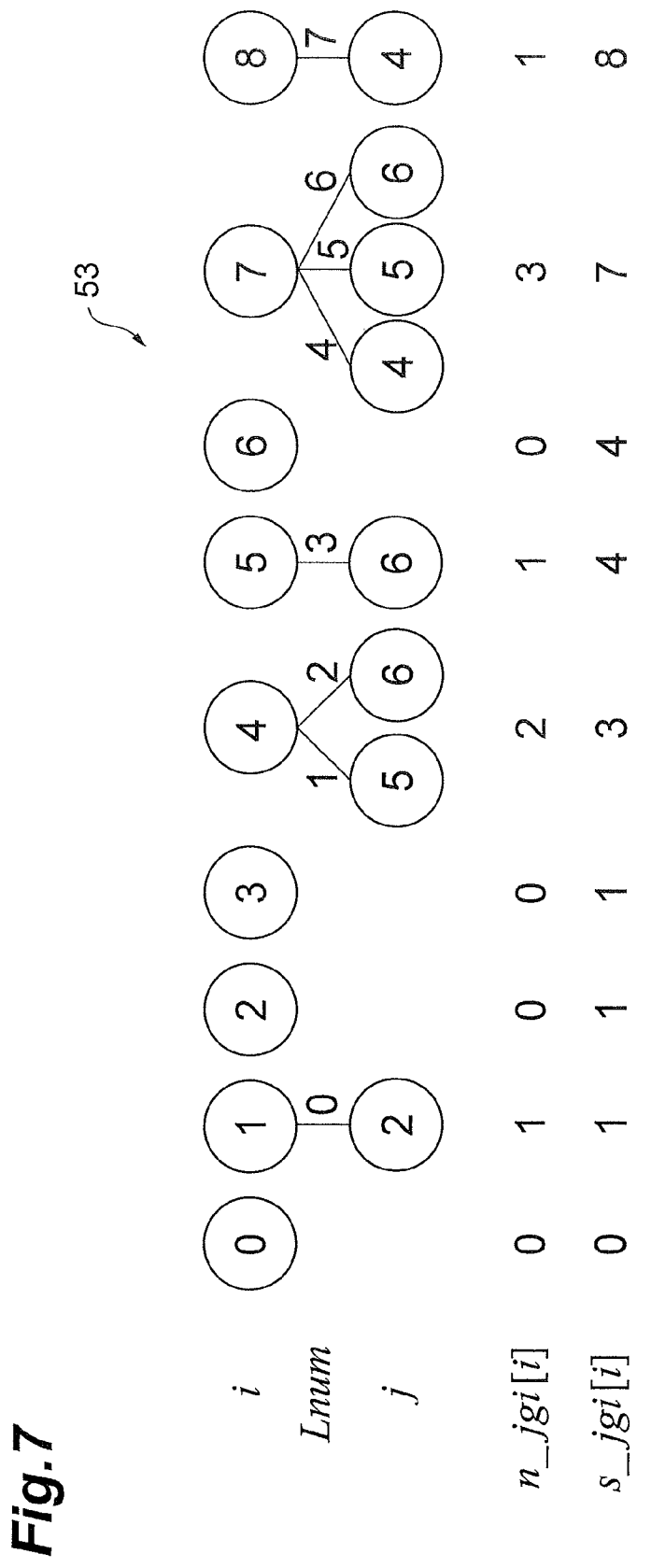
FIG. 7 illustrates an example configuration of a contact-candidate list.

Upon receiving the information (neighboring-particle table 52 nei_pn[i][box_id], neighboring particle numbers n_jli[i] and n_jgi[i], and particle information) from the neighboring-particle-table preparing unit 15, the contact-candidate-list preparing unit 16 determines a prefixed sum s_jgi of n_jgi, as illustrated in FIG. 7, using the following expression.

$$s\_jgi[i] = \sum_{p\_id=0}^{i} n\_jgi[p\_id] \quad (11)$$

The prefixed sum s_jgi[i] is a one-dimensional sequence representing an integral value, which integrates, up to the particle number i, the particle numbers of particles not stored in the neighboring-particle table 52 of particle i, i.e., the number of particles n_jgi[i] (number of contact candidates) having a diameter smaller than that of the particle i among all particles existing in a predetermined search range around the particle i (a neighboring cell defined by Expression 9). In this embodiment, the prefixed sum s_jgi[i] is referred to as "integral contact-candidate number." Specifically, the integral contact-candidate number s_jgi[i] is a value integrating the contact candidates n_jgi[i] in the order of particle numbers.

The contact-candidate-list preparing unit 16 sequentially selects target particles i in the ascending order of the particle numbers, re-searches the cell, which is the searching range around the particle i defined by Expression 9, and extracts the corresponding particles j, which satisfy the following conditions, from among particles contained in the searching range around the particle i: a) particles of which the interparticle distance to the particle i is smaller than dis_lim; b) particles having a diameter smaller than the diameter of the particle i; and c) if particles have the same diameter as the diameter of the particle i, the particles having a particle number assigned in the initial position smaller than the particle number of the particle i. Contact-candidate numbers Lnum are assigned to the pairs of particles i and j in the ascending order, and the particle number of the particles i and j are respectively stored in the one-dimensional sequences list_i and list_j to prepare the contact-candidate list 53.

Satisfying Conditions a), b), and c) is equivalent to satisfying above-described Conditions (a) of the extracting conditions for the neighboring particles to be stored in the neighboring-particle table 52 but not satisfying Conditions (b) and (c). The particle pairs not stored in the neighboring-particle table 52 are the contact-candidate pairs (for example, the contact-candidate pairs are pairs including particles 5 and 6 (i=5 and i=6), if the target particle i is numbered 4 (i=4)).

For the example illustrated in FIG. 7, the content of the contact-candidate list 53 is prepared as Table 1.

TABLE 1

|  | Lnum | | | | | | | |
| --- | --- | --- | --- | --- | --- | --- | --- | --- |
|  | 0 | 1 | 2 | 3 | 4 | 5 | 6 | 7 |
| list_i[Lnum] | 1 | 4 | 4 | 5 | 7 | 7 | 7 | 8 |
| list_j[Lnum] | 2 | 5 | 6 | 6 | 4 | 5 | 6 | 4 |

Specifically, the contact-candidate list 53 contains contact-candidate-pair information including pairs of particles list_i and list_j, which may be in contact with each other for all particles in the work area 51, together with particle numbers Lnum.

The amount of expansion/contraction of the spring required for determination of the contact force in the normal direction is an integral value. If paired contact-candidate particles are in contact with each other both in the previous step and the current step, the amount of expansion/contraction of the spring in the normal-direction should be retained for updating the contact-candidate pair list. The paired contact candidates Blist_i and Blist_j in the previous step are thus searched to determine whether the paired contact-candidates list_i and list_j in the current step were also pairs in the previous step. If they were pairs, the normal vector and the spring force (the amount of expansion/contraction of the spring) in the tangential direction in the particle model illustrated in FIG. 2 are stored in sequences of new candidate list numbers.

Parameters and sequences in the previous step and the current step are represented as listed in the table below.

|  | Previous step | Current step |
|---|---|---|
| Particle number | Bi = Bpn[i], Bj = Bpn[j] | i, j |
| Contact-candidate list | Blist_i, Blist_j | list_i, list_j |
| Integral contact-candidate number | Bs_jgi | s_jgi |
| Normal vector and contact force in tangential direction | BSpring | Spring |

If a contact-candidate pair of the particle numbers i=list_i[Lnum] and j=list_j[Lnum] is present, the particle numbers in the previous step is Bi=Bpn[i] and Bj=Bpn[j], respectively. The contact candidates Blist_j[BLnum] within the range of Bs_jgi[Bi−1] to Bs_jgi[Bi]−1 are checked to confirm whether they match Bj. If a contact candidate matches Bj, the corresponding list number BLnum is used to substitute the normal vector and contact force BSpring[BLnum] in the tangential direction in the previous step into the current list-number sequence Spring[Lnum].

Figure 8:
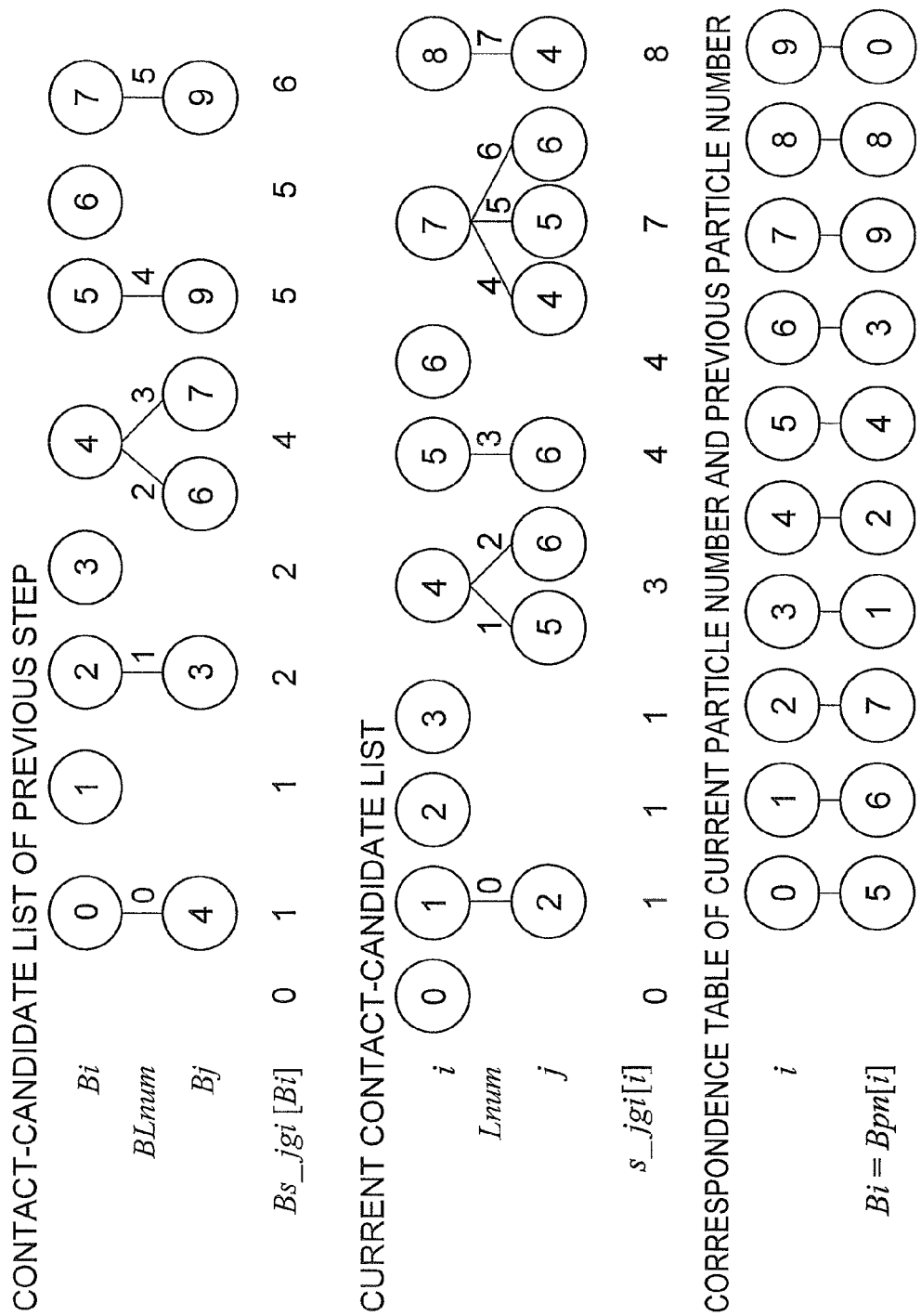
FIG. 8 illustrates a process of confirming whether the paired particles in the current contact-candidate list were paired in the previous step.

A process of determining whether paired particles 4 and 6 (i=4, j=6) in the current contact-candidate list numbered Lnum=2 were also a pair in the previous step will be described with reference to FIG. 8.

The particle numbers of particles i=4 and j=6 in the previous step are Bi=2=Bpn[4] and Bj=3=Bpn[6], respectively, which are determined using the Bpn[ ] function. Similar to the relationship between i and j, the relationship between Bi and Bj always satisfy Conditions a), b), and c) of the contact-candidate list 53 for the following reason. Conditions a), b), and c) are based on the particle diameter and particle number in the initial position, which do not change by sorting. Accordingly, the particle numbers of contact candidates of Bi are stored in Blist_j[BLnum] having list numbers BLnum within the range of Bs_jgi[Bi−1] and Bs_jgi[Bi]−1 (which, in this example, is a range from 1 to 1). Blist_j[BLnum] is checked against Bj within the range of BLnum. When BLnum=1, Blist_j [1]=3, which is also consistent with Bj=3.

Accordingly, the candidate pair in the current list numbered Lnum=2 was a pair in the previous step, having a list number BLnum=1. The contact condition in the previous step can be retained by substituting the normal vector and the contact force in the tangential direction of BLnum=1 into the sequence Lnum=2 (Spring[2]=BSpring[1]).

Upon receiving various items of information (neighboring-particle table 52 nei_pn[i][box_id], numbers of neighboring particles n_jli[i] and n_jgi[i], and particle information) from the neighboring-particle-table preparing unit 15, the contact-candidate-list preparing unit 16 assigns a number Lnum to each pair of a target particle i and a particle j, which satisfies above-described Conditions a), b), and c), among the particles in the searching range and stores the particle numbers of the paired particles i and j in the sequences list_i[Lnum] and list_j [Lnum], respectively, in the contact-candidate list 53. Furthermore, an integral contact-candidate number s_jgi[i], which is an integral value of the numbers n_jgi[i] of particles present in the cells surrounding a particle i and having a diameter smaller than that of the particle i is calculated for each target particle i. Pairs, which were contact candidate pairs in the previous step are extracted from the current contact-candidate pairs list_i[Lnum] and list_j [Lnum], and the contact force of these extracted pairs is stored in Spring[Lnum] by retaining the values from BSpring[BLnum]. Then, the derived contact-candidate list 53 list_i[Lnum] and list_j [Lnum] and the neighboring-particle table 52 nei_pn[i][box_id] are sent to the contact-force-reference-table preparing unit 17, and the information of the contact-candidate list 53 list_i[Lnum] and list_j[Lnum], the integral contact-candidate number s_jgi[i], and the retained contact force Spring[Lnum] of the contact-candidate pairs, which were also pairs in the previous step, are sent, together with the particle information, to the contact determining unit 18.

Figure 9:
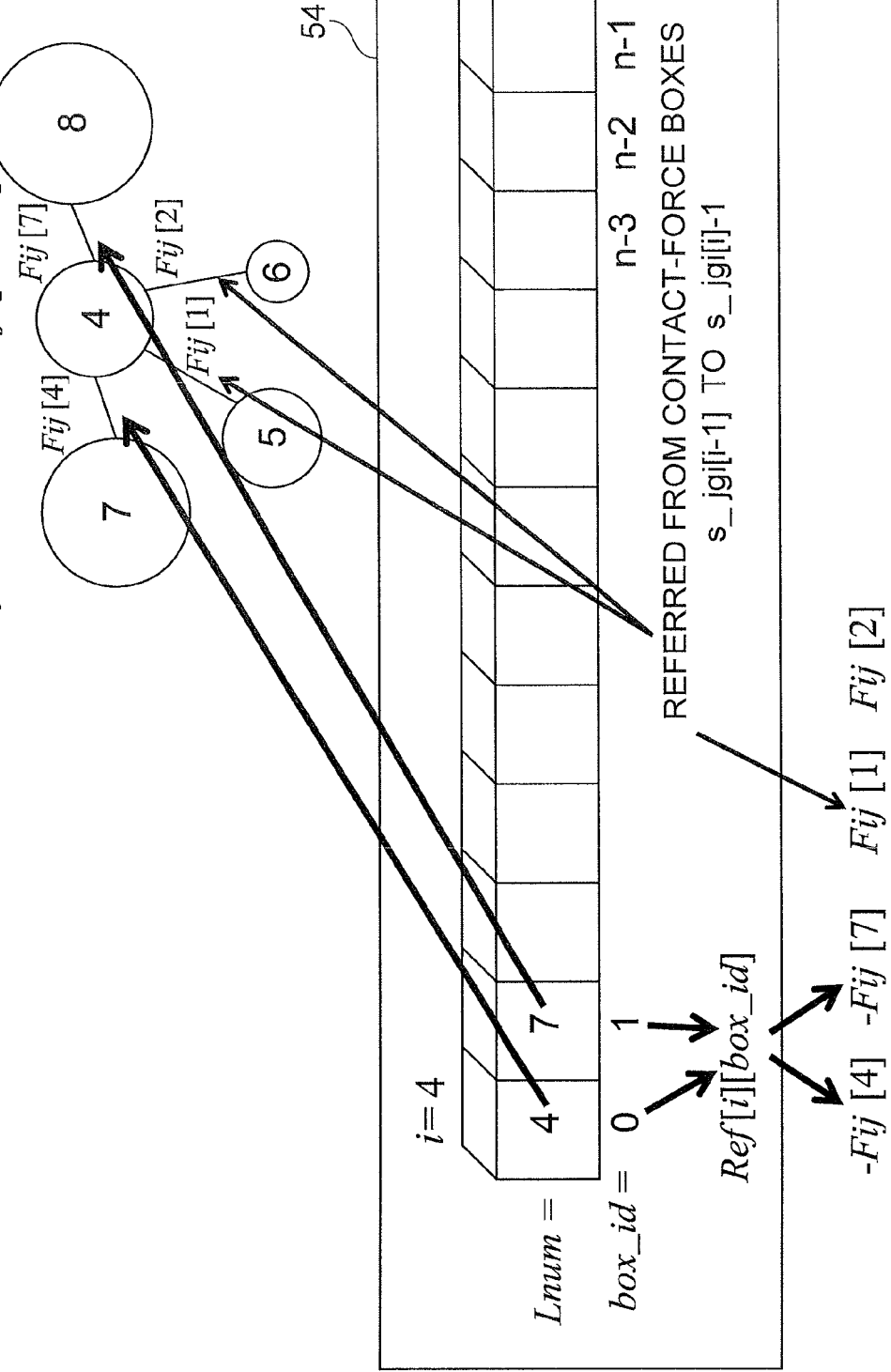
FIG. 9 illustrates an example configuration of a contact-force reference table.

The contact-force-reference-table preparing unit 17 generates a function Ref[i] [box_id] to calculate candidate list numbers Lnum from corresponding box numbers box_id. In this embodiment, a two-dimensional sequence Ref[i] [box_id] representing this function is referred to as "contact-force reference table 54." As illustrated in FIG. 9, the contact-force reference table 54 collects references (Lnum) (reference information) for every particle i (i=4 in FIG. 9) on the contact force Fij[Lnum] of the particle i in the contact-candidate list 53 that receives from particle j. Specifically, in this embodiment, the contact-force reference table 54 includes only references (Lnum) for contact forces between particles i and neighboring particles stored in the neighboring-particle table 52 associated with the target particles i, i.e., particles having a diameter greater than that of the target particles i. The references for contact forces (Lnum) are contact-candidate-pair-list numbers (contact-candidate numbers) Lnum used for obtaining the respective contact forces from contact-force boxes each containing two different one-dimensional sequences Fijt[Lnum] and Fijr[Lnum] respectively holding the translational component and rotational component of an interparticle contact force, which is described below, and a contact force Fij[Lnum] including β[Lnum], which is used in Expression 13 described below.

Memory regions are reserved in advance in the contact-force-reference-table preparing unit 17 for preparing the contact-force reference table 54. The memory regions for the contact-force reference table 54 are set to the same size in consideration of the number of neighboring particles that may come into contact with each particle.

Upon receiving the contact-candidate list 53 list_i[Lnum] and list_j[Lnum] and the neighboring-particle table 52 nei_pn[i][box_id] from the contact-candidate-list preparing unit 16, the contact-force-reference-table preparing unit 17 searches the neighboring-particle table 52 of particles j for a particle i (i=list_i[Lnum]) and a particle j (j=list_j[Lnum]), which are the Lnumth particle pair in the contact-candidate list 53, to acquire the neighboring-particle-table number k (k=box_id) containing the particle i. As described above, since a particle j of a contact-candidate pair has a diameter smaller than that of the particle i, the particle i is stored in the neighboring-particle table 52 of the particle j as a neighboring particle. The contact-candidate-list number Lnum of the particles i and j is stored in the kth sequence Ref[j][k] of the contact-force reference table 54 of the particle j.

The contact-candidate list 53 by the contact-candidate-list preparing unit 16 and the contact-force reference table 54 by the contact-force-reference-table preparing unit 17 can be prepared through the following algorithm. "Contact-candidate-pair condition==true" in the following algorithm means that Conditions a), b), and c) of the contact-candidate list 53 are satisfied.

```
for(Search neighboring cell){
    if(Contact-candidate-pair condition===true){
        box_id = box_id+1
        Lnum = s_jgi[i−1]+box_id
```

```
            list_i[Lnum] = i
            list_j[Lnum]= j
            for(k = 0;k<n_jli[j];k++){
                if(nei_pn[j][k]==i){
                    Ref[j][k] = Lnum
                }
            }
        }
    }
}
```

In this embodiment, the contact-force reference table 54 includes only particles that have a diameter greater than that of the target particle. Therefore, for the same reason as the neighboring-particle table 52 described above, the amount of memory used for the sequences prepared in advance for the contact-force reference table 54 is inhibited.

The contact-force-reference-table preparing unit 17 sends the derived contact-force reference table 54 Ref[i][box_id] to the contact-force calculating unit 19.

The contact determining unit 18 refers to the contact-candidate list 53 to determine whether paired particles are in contact with each other for every particle pair and calculates the interparticle contact force Fijr and Fijt in the case where the paired particles are in contact with each other.

Specifically, upon receiving from the contact-candidate-list preparing unit 16 the contact-candidate list 53 list_i [Lnum] and list_j [Lnum], the integral contact-candidate number s_jgi[i], and the contact force Spring[Lnum] of the contact-candidate pairs, which were also pairs in the previous step, and the particle information or receiving from the contact-candidate-list-update determining unit 13 the particle information, the contact determining unit 18 scans the contact-candidate list 53 to determine the contact between the particles i and j of the contact-candidate pairs. Particles i and j are determined to be in contact with each other, for example, if the calculated interparticle distance between particles i and j is smaller than or equal to the sum $r_i+r_j$ of the diameters of the particles i and j.

If it is determined that the particles i and j are in contact with each other, the contact force components Fn and Ft are calculated using Expressions 1 and 2 of the above-described Voigt model. The tangential component of the current contact force of the spring is calculated using Expression 2, where $K_t x_t$ equals to spring[ ]+ΔFt, spring[ ] represents the tangential components of the contact force of the spring in the previous step, as described above, and ΔFt represents an increase (or decrease) in the tangential component of the contact force of the spring from the previous step to the current step. ΔFt is calculated by multiplying the relative speed between the particles i and j by the time Δt of one step and the elastic modulus Kt of the tangential component of the spring. The elastic modulus Kn of the normal component of spring 72, the elastic modulus Kt of the tangential component of the spring 72 and the coefficient of restitution e between the particles are values set prior to the simulation. The viscous damping coefficients ηn and ηt of the dashpot 73 are derived from Expression 3 using the given Kn, Kt, and e and masses mi and mj included in the particle information. The relative interparticle displacement components xn and xt and the relative velocity components vn and vt are calculated on the basis of the particle coordinates (position information) and translational velocity and rotational velocity (velocity information) included in the particle information. Fn and Ft are calculated from Expressions 1 and 2 using the variables and parameters acquired as described above. The calculated Fn and Ft are used to calculate the translational component Fn+Ft and rotational component Ri×Fr of the contact force. These calculated components are stored in sequences Fijt [Lnum] and Fijr[Lnum] (sequences contained in the above-described contact-force boxes) having the contact-candidate-pair list numbers (contact-candidate numbers) Lnum as elements.

If the particles are not in contact, the contact force equals zero and thus zero is stored in the sequences Fijt[Lnum] and Fijr[Lnum] (sequences contained in the above-described contact-force boxes) having the contact-candidate-pair list numbers Lnum as elements.

This contact force is calculated by the contact determining unit 18 through the following algorithm.

```
for(Lnum){
    i = list_i[Lnum]
    j = list_j[Lnum]
    if(Contact determination==true){
        Calculation of contact force components (Fn, Ft)
        Fijt[Lnum] = Fn + Ft
        Fijr[Lnum] = Ri × Ft
    } else {
        Fijt[Lnum] = 0
        Fijr[Lnum] = 0
    }
}
```

The contact determining unit 18 creates or updates the contact-force boxes such that they are linked to the contact-candidate-pair-list numbers Lnum every time the contact-candidate list 53 is created or updated. Even if the contact-candidate list is not updated, the contact-force boxes are created or updated using an existing contact-candidate list upon the update of the particle information.

Contact determination and the contact force are calculated by threading the contact-candidate-pair-list numbers. The global memory of the GPU achieves optimal access efficiency when the access pattern is equivalent to the thread order. Since the particle pair numbers are random with respect to the list numbers, the global memory in which the particle information is stored is accessed randomly, causing a significant decrease in the memory-access speed. In contrast, a texture memory having a cash feature can prevent a decrease in memory-access speed due to random access. Therefore, the global memory region in which the particle information is stored is set so that it can be referred to from a texture memory. Furthermore, since the particles are numbered in accordance with the order of the cell number of the cells containing the particles, the particles in a contact-candidate pair have close numbers. Moreover, the contact-candidate-pair list contains the particle numbers i in the ascending order. Therefore, by threading the contact-candidate-pair-list numbers, the cash hit rate increases, and the speed of processing routines for determining whether particles contact each other and calculating the contact force is increased.

The contact determining unit 18 sends the information of the created or updated contact-force boxes, together with the integral contact-candidate numbers s_jgi[i] and the particle information, to the contact-force calculating unit 19.

The contact-force calculating unit 19 calculates the translational component $Ft_{all}[i]$ and rotational component $Fr_{all}[i]$ of the total contact force acting on the particles i using the contact-force reference table 54 and the integral contact-candidate numbers s_jgi. Upon receiving the contact-force reference table 54 from the contact-force-reference-table preparing unit 17 and receiving the integral contact-candidate numbers from the contact determining unit 18, the contact-force calculating unit 19 extracts the contact force between each target particle i and a particle in contact with the particle i from the contact-force boxes using the contact-force reference table 54 and the integral contact-candidate numbers s_jgi. Specifically, for particles having a diameter greater than a target particle i, the contact forces Fij[Lnum] corresponding to the box numbers are extracted from the contact-force boxes having box numbers (Lnum) (reference information) stored in the contact-force reference table 54. For the particles having a diameter smaller than that of the target particle i, the contact forces are extracted by specifying the storage positions of the contact-force tables using the integral contact-candidate numbers s_jgi[ ]. More specifically, contact forces Fij[s_jgi[i−1]] to Fij[s_jgi[i]−1] corresponding to the box numbers (contact-candidate numbers) s_jgi[i−1] to s_jgi[i]−1 is extracted from the contact-force boxes. The contact forces Fij[ ] stored in the contact-force boxes are each stored as group of three one-dimensional sequences of the translational component Fijt[Lnum], the rotational component Fijr[Lnum], and the β[Lnum] used in Expression 13, which is described below.

Figure 10:
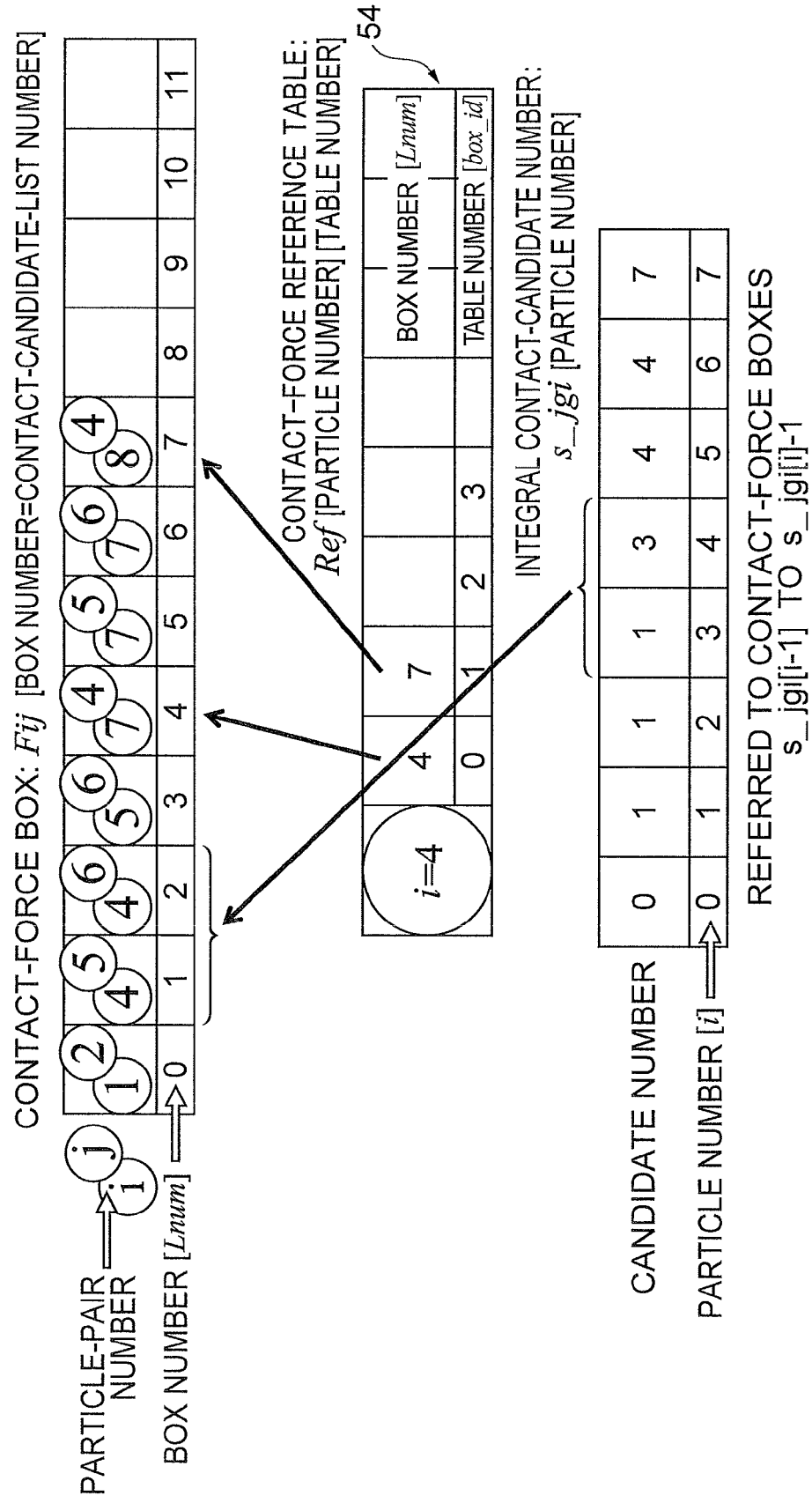
FIG. 10 illustrates the correspondence among a contact-force reference table, integral-contact-candidate numbers, and contact-force boxes.

The extraction of contact forces from contact force boxes will be described in detail below with reference to FIG. 10. FIG. 10 is an example in which the target particle i is numbered 4 (i=4), as in FIGS. 6 and 9. The contact-force reference table 54 contains reference information on the contact forces between the target particle (i=4) and particles (i=7, 8) having a diameter greater than the target particle (i=4). The box number (contact-candidate-list number) Lnum of the contact-force box containing the contact force between the target particle i=4 and the particle i=7 is 4, and the box number Lnum of the contact-force box containing the contact force between the target particle i=4 and the particle i=8 is 7. The contact-force calculating unit 19 uses these box numbers in the contact-force reference table 54 to extract the contact force Fij[4] between the target particle i=4 and the particle i=7 and the contact force Fij[7] between the target particle i 4 and the particle i=8 from the contact-force boxes.

As illustrated in FIG. 10, the integral contact-candidate number s_jgi[i] of the target particle i=4, which is represented as s_jgi[4], is equal to 3. The integral contact-candidate number s_jgi[i−1] of the particle having the particle number prior to the particle number of the target particle (which is i=3 in FIG. 10) is represented as s_jgi[3] and is equal to 1. Accordingly, for particles having a diameter smaller than the target particle i=4 (which are j=5, 6 in this example), the contact forces Fij[1] and Fij[2] are extracted from the contact-force boxes numbered s_jgi[i−1] to s_jgi[i]−1, i.e., boxes numbered 1 and 2.

Then, the translational components FUN and the rotational components $Fr_{all}[i]$ of the all contact forces acting on every particle i are calculated using the contact forces Fij[ ] (=Fijt[ ], Fijr[ ], β[ ]) extracted from the contact-force boxes.

All contact forces (translational components) $Ft_{all}[i]$ acting on a particle i is obtained by summating the contact forces corresponding to the contact-candidate-list numbers s_jgi[i−1] to s_jgi[i]−1 without changing their signs. In contrast, the contact forces obtained by referring to the contact-force reference tables 54 (Ref) numbered 0 to n_jli−1 are added together after reversing the signs. This is represented by the following expression.

$$Ft_{all}[i] = \sum_{box\_id=s\_jgi[i-1]}^{s\_jgi[i]-1} Fij_t[\text{box\_id}] - \sum_{box\_id=0}^{n\_jli[i]-1} Fij_t[Ref[i][\text{box\_id}]] \qquad (12)$$

All contact forces (rotary component) $Fr_{all}[i]$ acting on the particle i are obtained through a similar addition process. To calculate $Fr_{all}[i]$, the contact forces corresponding to the contact-candidate-list numbers s_jgi[i−1] to s_jgi[i]−1 are directly referred to, whereas the contact forces referred to in the contact-force reference tables 54 (Ref) numbered 0 to n_jli−1 are summated after the signs are reversed and β is multiplied. $Fr_{all}[i]$ is determined by the following expression, where β represents a value acquired by dividing the distance from the center of a particle j to the contact point with the distance from the center of a particle i to the contact point.

$$Fr_{all}[i] = \sum_{box\_id=s\_jgi[i-1]}^{s\_jgi[i]-1} Fij_r[\text{box\_id}] + \sum_{box\_id=0}^{n\_jli[i]-1} Fij_r[Ref[i][\text{box\_id}]] \times \beta[Ref[i][\text{box\_id}]] \qquad (13)$$

The contact forces corresponding to s_jgi[i−1] to s_jgi[i]−1 are contact forces from particles j to particles i, whereas the contact forces referred to in the contact-force reference tables 54 (Ref) numbered 0 to n_jli−1 are contact forces from the particles i to the particles j. Therefore, the translational components of the contact forces in the contact-force reference tables 54 (Ref) numbered 0 to n_jli−1 are summated after their signs are reversed, and the rotational components of the contact forces are summated after multiplying them by β[box id]. By directly referring to the contact forces from the particles j to the particles i in the sequences Fijt[ ] and Fijr[ ] containing the contact forces using s_jgi[i] but without using the contact-force reference tables 54 Ref[i][box id], the contact forces from numerous small particles to large particles, which can make contact-candidate pairs with the small particles, can be summated without an increase in memory size used for the contact-force reference tables 54.

Specifically, through calculation by a computer, $Ft_{all}$ and $Fr_{all}$ are determined by threading particles i and running a loop of box_id. Since the memory randomly accesses Fij, a texture memory is used. As described above, since a texture memory has a high cash hit rate, the processing speed is greater than directly accessing the global memory. Continuous access to the contact-force reference tables 54 is possible through array declaration to set the element size of B in the sequence Ref[A][B] is a factor of 16.

The contact-force calculating unit 19 sends, together with the particle information, the translational component $Ft_{all}[i]$ and the rotational component $Fr_{all}[i]$ of the total contact force acting upon each particle i, which are calculated as described above, to the particle-information updating unit 20.

Upon receiving the translational components $Ft_{all}[i]$ and the rotational components $Fr_{all}[i]$ of all contact forces acting on every particle i and the particle information from the contact-force calculating unit 19, the particle-information updating unit 20 calculates the coordinates of the particle (position information) and the translational and rotational velocities (velocity information) on the basis of the positions and velocities of the particles and contact forces received from the contact-force calculating unit 19 and updates the particle information stored in the particle-information retaining unit 11 using the calculated coordinate, translational velocity, and rotational velocity. Specifically, by solving a motion equation (Expression 4) of translational movement using the Leap-Flog method, the translational velocity and the particle coordinates at the current moment are determined. The motion equation (Expression 5) for rotational movement is also solved using the Leap-Flog method, and the acquired rotational velocity is set as a predicted value. By calculating the rolling friction corresponding to the predicted rotational velocity and solving the motion equation of rotational movement in consideration of the rotating force and the rolling friction due to the contact force, the rotational velocity at the current moment is determined.

The particle-information updating unit 20 uses the calculated position coordinates, the translational velocity, and the rotational velocity of each particle to update the coordinates, the translational velocity, and the rotational velocity in the particle information and sends the updated particle information to the particle-information retaining unit 11 to update the particle information in the particle-information retaining unit 11.

Figure 11:
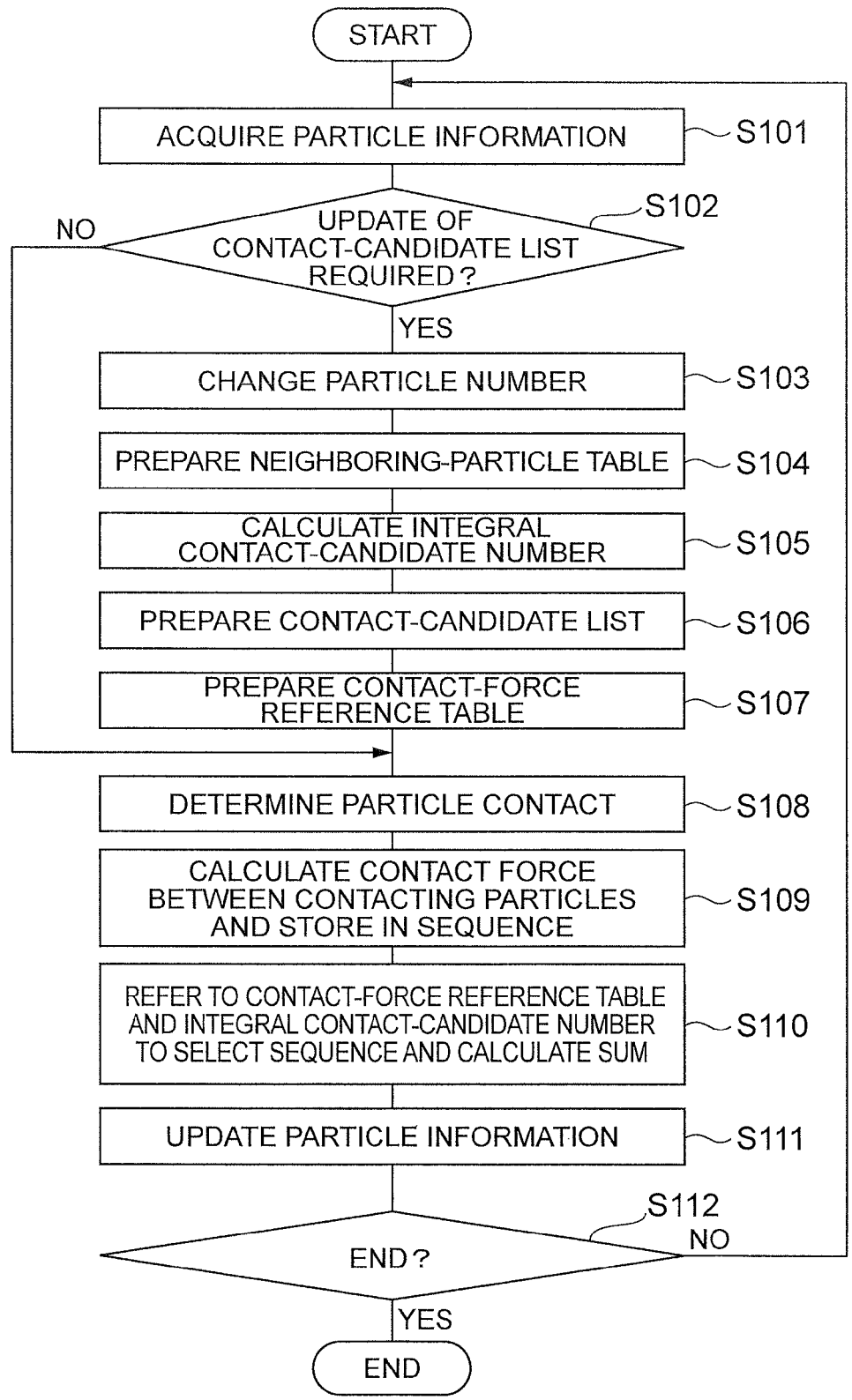
FIG. 11 is a flow chart illustrating the process performed by the particle simulator according to this embodiment.

With reference to FIG. 11, the processing by the particle simulator 10 and the particle simulation method according to this embodiment will be described below. FIG. 11 is a flow chart illustrating the processing by the particle simulator 10 according to this embodiment. The particle-information acquiring unit 12 acquires particle information, which is input to and stored in the particle-information retaining unit 11, from the particle-information retaining unit 11 (S101: Input step). The contact-candidate-list-update determining unit 13 determines whether the contact-candidate list is to be updated (S102). For example, the contact-candidate list is updated if a particle of which the integral traveling distance is greater than $r\alpha$ exists, where r represents the particle radius and $\alpha$ represents a parameter representing the updating frequency. For example, $\alpha$ is set to 0.2. If updating is required, then the process proceeds to Step S103, else the process proceeds to Step S108.

Subsequently, the particle numbers are changed by the particle-number changing unit 14 (S103: Assigning step). The particle-number changing unit 14 renumbers the particles in accordance with the order of the cell numbers of the cells containing the particles and renumbers the particles in the same cell in accordance with the order of particle diameter. Then, the neighboring-particle-table preparing unit 15 prepares the neighboring-particle table 52 including information of neighboring particles of every particle in the work area 51 (S104). Particles that satisfy Conditions (a), (b), and (c) are stored in the neighboring-particle tables 52 as neighboring particles.

Subsequently, the contact-candidate-list preparing unit 16 calculates the integral contact-candidate numbers s_jgi[i], which are the prefixed sums of particle numbers n_jgi[i] of particles satisfying Condition (a) but not satisfying Conditions (b) and (c) of the neighboring-particle tables 52 (S105: Integral contact-candidate-number calculating step). Then, the contact-candidate lists 53 including information of paired particles that may be in contact with each other among all particles in the work area 51 are prepared (S106: Contact-candidate selecting step). Particles that satisfy Conditions a), b), and c) are stored in the contact-candidate lists 53. The contact-force-reference-table preparing unit 17 prepares the contact-force reference tables 54 (S107: Contact-force reference table preparing step)

Subsequently, the contact determining unit 18 refers to the contact-candidate lists 53 to determine whether two particles are in contact with each other (S108). If the particles are in contact with each other, the interparticle contact force components Fijr and Fijt are calculated using Expressions 1 and 2 and are stored in sequences of contact-force boxes (S109: Contact-force calculating step). If the particles are not in contact with each other, the contact force components Fijr and Fijt, which equal to zero, are stored in the sequences of the contact-force boxes.

The contact-force calculating unit 19 refers to the contact-force reference tables 54 and the integral contact-candidate numbers s_jgi[i] to select other particles in contact with target particles and obtains the contact forces from corresponding sequences Fijr and Fijt in the contact-force boxes. The sum of the contact forces is calculated using Expressions 12 and 13, and the contact force components Fr and Ft acting on every particle (S110: Contact-force-sum calculating step) are calculated. The particle-information updating unit 20 calculates the coordinates of every particle (position information) and the translational and rotational velocities (velocity information) on the basis of the contact force components calculated in Step S109 and the current particle information, and the particle information stored in the particle-information retaining unit 11 is updated using the calculated coordinates, translational velocity, and rotational velocity (S111: Particle-information updating step).

Then, it is determined whether the particle simulation is completed (S112). For example, when a predetermined amount of time has elapsed, it is determined that the particle simulation is completed. When the particle simulation is not yet completed, the process returns to Step S101 and proceeds to the next step. When the particle simulation is completed, the process ends.

Figure 12:
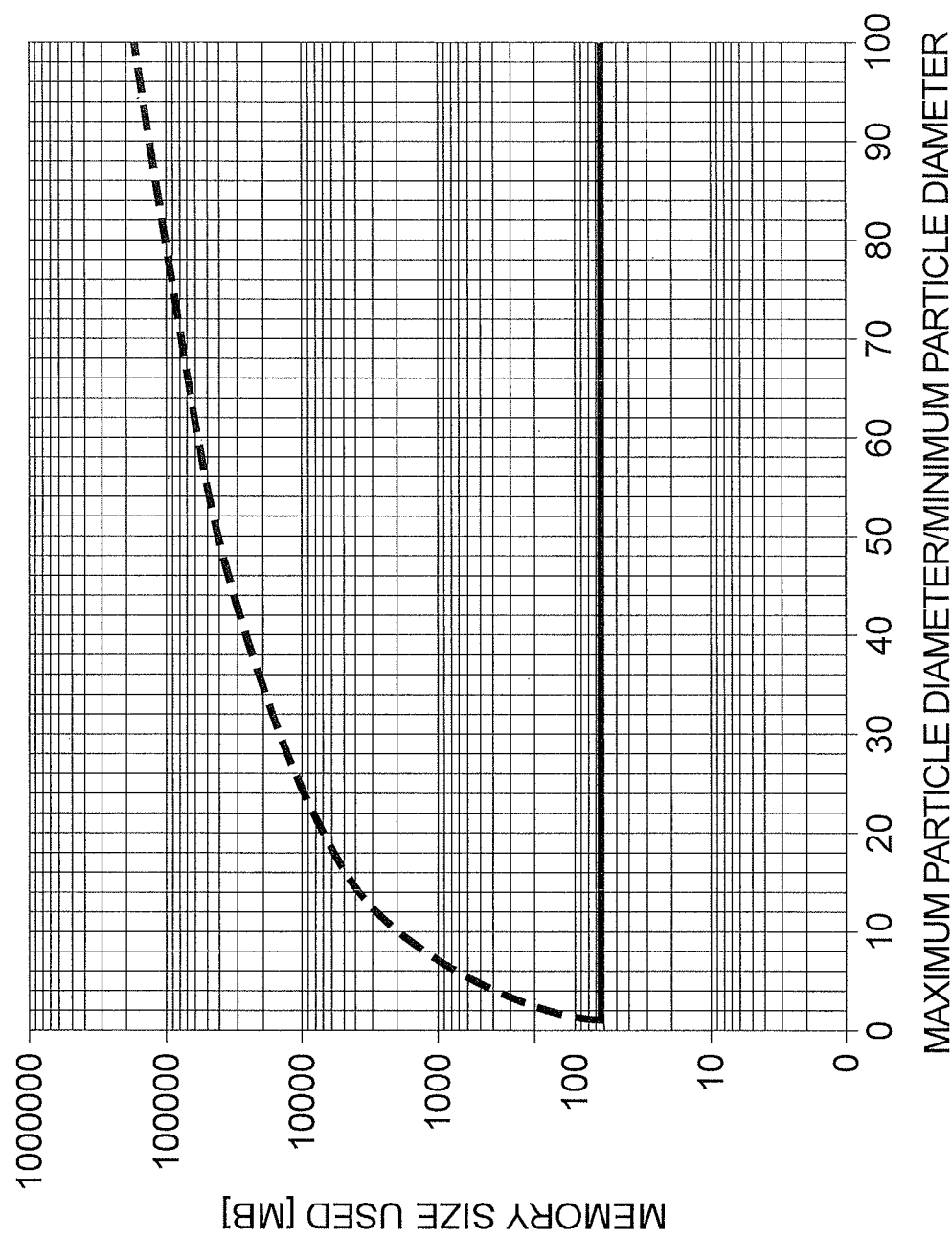
FIG. 12 is a diagram illustrating a comparison of the memory size used in this embodiment and a comparative example, when the ratio of the maximum particle diameter to the minimum particle diameter is varied in the particle model.

The amount of memory used by the particle simulator 10 according to this embodiment will be described below with reference to FIG. 12. FIG. 12 illustrates the amounts of memory used in this embodiment (solid line) and comparative example (dotted line) at a variable ratio of the maximum particle diameter to the minimum particle diameter of the particle model. The particle model includes 1,000,000 particles and is a two-component system containing particles having a maximum particle diameter (maximum particles) and particles having a minimum particle diameter (minimum particles). The comparative example differs from the embodiment in that information on particles having a diameter smaller than that of the target particle i are stored in the neighboring-particle table 52 and the contact-force reference table 54. In FIG. 12, the horizontal axis represents the ratio of the maximum particle diameter to the minimum particle diameter, and the vertical axis represents the memory size used (MB).

In the case of the comparative example, the memory size required for the neighboring-particle tables 52 nei_pn[i][box_id] and the contact-force reference tables 54 Ref[i][box_id] is equal to the product of the number of particles, the number of maximum contact-candidate particles, and 4 bytes, if 4 bytes are needed for each data item. The number of maximum contact-candidate particles is the maximum number of neighboring particles stored in the neighboring-particle table 52 and the contact-force reference table 54. In the case of the minimum particles filling the surface of a maximum particle, the number of maximum contact-candidate particles is represented by the following expression:

$$4\pi(r_{max}+r_{min})^2/\pi r_{min}^2 \qquad (14)$$

where $r_{max}$ represents the diameter of a maximum particle, and $r_{min}$ represents the diameter of a minimum particle. As illustrated in FIG. 12, in the comparative example, as the maximum particle diameter increases with respect to the minimum particle diameter, i.e., as the ratio of the maximum particle diameter to the minimum particle diameter increases, the number of maximum contact-candidate particles increases, causing an increase in the amount of memory used. For example, at a particle diameter ratio of 1:10 (maximum particle diameter/minimum particle diameter=10), the number of contact-candidate particles per particle increases to 500 particles at maximum and requires 2 GB of memory.

For this embodiment, since particles having a diameter smaller than that of the target particle are not selected as neighboring particles and are not stored in the neighboring-particle tables 52 and the contact-force reference tables 54, Expression 14 for calculating the number of maximum contact-candidate particles does not hold. The number of maximum contact-candidate particles in this embodiment does not depend on the maximum and minimum particle diameters. In this embodiment, the number of maximum contact-candidate particles depends only on the parameter α included in dis_lim=$(r_i+r_j)(1.0+\alpha)$, which is a threshold of the interparticle distance in above-described Condition (a) of neighboring particles but does not depend on the particle diameter distribution and is a constant. The amount of memory used is calculated for a case in which α is set to 0.2, and the number of maximum contact-candidate particles is set to 16, which is a sufficient number satisfying any particle-diameter distribution condition. As a result, as illustrated in FIG. 12, the memory size used in this embodiment is a constant value and is equal to the product of the number of particles, the number of maximum contact-candidate particles, and 4 bytes, which equal 64 MB (1000000×16×4=64).

According to the particle simulator 10 and the particle simulation method according to this embodiment, for a particle neighboring a particle i and having a diameter smaller than that of the particle i, among all particles in the work area 51, only the integral contact-candidate numbers s_jgi[i], which represent the numbers of particles, is stored. The contact determining unit 18 uses the integral contact-candidate number s_jgi[i] to specify a storage position in a contact-force table to extract the contact force between the particle i and another particle. In this way, the contact-force reference tables 54 do not have to contain information associated with particles having a diameter smaller than that of particles i, among particles neighboring the particles i, and merely information on particles having a diameter greater than that of the particles i needs to be stored. For simulation on a particle group having a particle diameter distribution, if particles having a diameter smaller than that of the particle are considered, the number of particles that may simultaneously contact the particle will increases. Thus, a large memory size must be provided in advance for the contact-force reference table 54. In contrast, if the above-described configuration is used, merely the contact between the particle and particles having a diameter greater than that of the particle need to be considered. Thus, the number of particles for which contact determination need to be performed is decreased, and the amount of memory required for preparing the contact-force reference tables 54 can be decreased. As a result, the memory size used can be inhibited. By inhibiting the memory size used, particle simulation can be performed using a shared-memory parallel computer, such as a GPU.

The particle-number changing unit 14 specifies all particles in the work area 51 in the order corresponding to the cell numbers, assigns particle numbers to the specified particles contained in the same cell in the order corresponding to the particle diameter, and sorts the particles in the order of the cell numbers and, for particles in the same cell, in the order of the particle diameter. Accordingly, during preparation of the contact-force reference tables, particles having a small diameter can be easily recognized on the basis of the particle numbers and do not have to be selected for entry to the contact-force reference tables. As a result, the calculation efficiency can be improved for preparation of the contact-force reference table.

An embodiment of the present invention has been described above. The present invention, however, is not limited to this embodiment. In the above-described embodiment, the particle-number changing unit 14 sorts the particles in two steps: 1) the particles are arranged in accordance with the order of the cell numbers containing the particles; and 2) the particles in the same cell are rearranged in the order of particle diameter. Instead of performing the two steps, only the first step may be performed.

In the above-described embodiment, a GPU is used for the present invention. Instead, shared-memory hardware (for example, a vector processor) that performs single instruction multiple data (SIMD) parallel processing in the same manner as the GPU, i.e., a shared-memory parallel computer, may be used.

What is claimed is:

1. A particle simulator simulating the behavior of particles in a particle group having a diameter distribution in a work area through calculation of positions and velocities of the particles based on values of contact forces generated between the particles and other particles in the particle group, the particle simulator comprising:

input means for inputting particle information including position information and velocity information of the particles;

particle-information storing means for storing the particle information;

assigning means for assigning specific information items to the particles to identify the particles in an order in accordance with the position information;

contact-candidate selecting means for selecting target particles from particle group in the ascending order of the specific information items and selecting non-target particles paired with the target particles as contact-candidate pairs, the non-target particles presumably being in contact with the target particles and having a diameter smaller than the diameter of the target particles;

contact-force calculating means for calculating the values of contact forces generated between the two particles in the contact-candidate pairs selected by the contact-candidate selecting means based on the position information and the velocity information of the paired particles and storing information items of the calculated values of contact forces in an order corresponding to the order of the contact-candidate pairs in contact-force tables;

contact-force-reference-table preparing means for preparing contact-force-reference tables including reference information used to refer to the contact-force tables to retrieve the values of contact forces generated between target particles and neighboring non-target particles, wherein, for a given target particle, non-target particles having a diameter greater than the diameter of the target particle are considered;

integral-contact-candidate-number calculating means for calculating integral contact-candidate numbers, wherein an integral contact candidate number is an integer value denoting the number of non-target neighboring particles associated with a target particle having a diameter smaller than the diameter of the target particle;

contact-force-sum computing means for extracting the values of contact forces generated between target particles and non-target particles having a diameter greater than the diameter of the target particles by using the reference information in the contact-force-reference tables, extracting the values of contact forces generated between the target particles and non-target particles having a diameter smaller than the diameter of the target particles by specifying the storage positions of the values of contact forces in the contact-force tables using the integral contact-candidate numbers, and computing the sum of contact forces for each target particle using the extracted values of contact force;

calculating means for calculating new position information and velocity information of the target particles based on the values of contact forces of the particles calculated by the contact-force-sum computing means; and particle-information updating means for updating the particle information stored in the particle-information storing means using the new position information and velocity information calculated by the calculating means.

2. The particle simulator according to claim 1, wherein the work area is segmented into a plurality of cells, each cell having a cell number, the particle information includes the cell numbers of the cells specified by the position information and containing the particles, and the assigning means identifies the particles in an order corresponding to the cell numbers and assigns specific information items specified in accordance with the order corresponding to the particle diameter to particles in the same cell.

3. The particle simulator according claim 2, wherein the contact-candidate selecting means selects the target particles from the particle group in the ascending order of the specific information items and prepares contact-candidate lists of the target particles including, for all of the particles in the work area, contact-candidate-pair information including pairs of the target particles and the non-target particles presumably being in contact with the target particles and having a diameter smaller than the diameter of the target particles and contact-candidate numbers assigned to the pairs in the ascending order;

the contact-force calculating means calculates the values of contact forces generated between the paired particles corresponding to the contact-candidate-pair information included in the contact-candidate lists are calculated based on the position information and the velocity information of the paired particles and stores contact-force information linking the calculated values of contact forces and the contact-candidate number in contact-force tables;

the contact-force-reference-table preparing means prepares the contact-force-reference tables linking the contact-candidate numbers associated with the target particles and non-target particles as reference information used to refer to the contact-force tables to retrieve the values of contact forces generated between the target particles and the non-target particles presumably being in contact with the target particles and having a diameter greater than the diameter of the target particles;

the integral-contact-candidate-number calculating means calculates integral contact-candidate numbers s jgi[i] (where i represents specific information items of the particles) indicating the number of non-target particles presumably being in contact with a given target particle and having a diameter smaller than the diameter of the target particle; and the contact-force-sum computing means extracts the values of contact forces of the target particles from the contact-force tables using the reference information of the contact-force-reference tables, extracts the values of contact forces corresponding to the contact-candidate numbers s jgi[i−1] to s jgi[i]−1 from the contact-force tables using the integral contact-candidate numbers s jgi[i], and calculates the sum of the contact forces of the target particles using the extracted information of the contact forces.

4. A method of simulating particles in a particle simulator, the method simulating the behavior of particles in a particle group having a diameter distribution in a work area by calculating the positions and velocities of the particles based on values of contact forces generated between the particles and other particles in the particle group, the method comprising, the steps of:

inputting particle information including position information and velocity information of the particles and storing the particle information in particle-information storing means;

assigning specific information items to the particles to identify the particles in an order in accordance with the position information;

selecting target particles from particle group in the ascending order of the specific information items and selecting non-target particles paired with the target particles as contact-candidate pairs, the non-target particles presumably being in contact with the target particles and having a diameter smaller than the diameter of the target particles;

calculating the values of contact forces generated between the two particles in the contact-candidate pairs selected in the selecting step based on the position information and the velocity information of the paired particles and storing information items of the calculated values of contact forces in an order corresponding to the order of the contact-candidate pairs in contact-force tables;

preparing contact-force-reference tables including reference information used to refer to the contact-force tables to retrieve the values of contact forces generated between target particles and neighboring non-target particles, wherein, for a given target particle, non-target particles having a diameter greater than the diameter of the target particle are considered;

calculating integral contact-candidate numbers, wherein an integral contact candidate number is an integer value denoting the number of non-target neighboring particles associated with a target particle having a diameter smaller than the diameter of the target particle;

extracting the values of contact forces generated between target particles and non-target particles having a diameter greater than the diameter of the target particles by using the reference information in the contact-force-reference tables, extracting the values of contact forces generated between target particles and non-target particles having a diameter smaller than the diameter of the target particles by specifying the storage positions of the values of contact forces in the contact-force tables using the integral contact-candidate numbers, and computing the sum of contact forces for each target particle using the extracted values of contact force;

calculating new position information and velocity information of the target particles based on the values of contact forces of the particles calculated in the extracting step; and updating the particle information stored in the particle-information storing means using the new position information and velocity information calculated by the calculating step.

5. The method of simulating particles according to claim 4, wherein the work area is segmented into a plurality of cells, each cell having a cell number;

the particle information includes the cell numbers of the cells specified by the position information and containing the particles; and in the assigning step, the particles in an order corresponding to the cell numbers are identified and assign specific information items in accordance with the order corresponding to the particle diameter to particles in the same cell.

* * * * *